US012715210B2

(12) United States Patent
Watanabe

(10) Patent No.: US 12,715,210 B2
(45) Date of Patent: Aug. 25, 2026

(54) LIQUID EJECTING APPARATUS AND METHOD FOR CONTROLLING LIQUID EJECTING APPARATUS

(71) Applicant: SEIKO EPSON CORPORATION, Tokyo (JP)

(72) Inventor: Eiichiro Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 18/474,145

(22) Filed: Sep. 25, 2023

(65) Prior Publication Data

US 2024/0100823 A1 Mar. 28, 2024

(30) Foreign Application Priority Data

Sep. 26, 2022 (JP) ................................ 2022-152382

(51) Int. Cl.
*B41J 2/045* (2006.01)
*B41J 2/175* (2006.01)
*B41J 2/19* (2006.01)

(52) U.S. Cl.
CPC ....... *B41J 2/04551* (2013.01); *B41J 2/04508* (2013.01); *B41J 2/04581* (2013.01); *B41J 2/19* (2013.01)

(58) Field of Classification Search
CPC .......................................................... B41J 2/19
See application file for complete search history.

(56) References Cited

U.S. PATENT DOCUMENTS

2010/0141722 A1* 6/2010 Saito .......................... B41J 2/18 347/92
2012/0033003 A1* 2/2012 Tanaka ..................... B41J 2/175 347/6
2012/0162331 A1* 6/2012 Kataoka ................... B41J 2/175 347/89

FOREIGN PATENT DOCUMENTS

CN 217197467 8/2022
JP 2021-187009 A 12/2021

* cited by examiner

*Primary Examiner* — Shelby L Fidler
(74) *Attorney, Agent, or Firm* — WORKMAN NYDEGGER

(57) ABSTRACT

A liquid ejecting apparatus includes a mode controller that controls execution of a first mode in which an operation of the liquid ejecting head is controlled under pressurization at first pressure by the pressurizing mechanism and depressurization at second pressure by the depressurizing mechanism and execution of a second mode in which the operation of the liquid ejecting head is controlled under pressurization at third pressure by the pressurizing mechanism and depressurization at fourth pressure by the depressurizing mechanism. To switch from the execution of the first mode to the execution of the second mode, the mode controller gradually changes, from the first pressure to the third pressure, pressure at which the pressurization operation is performed by the pressurizing mechanism, and gradually changes, from the second pressure to the fourth pressure, pressure at which the depressurization operation is performed by the depressurizing mechanism.

10 Claims, 13 Drawing Sheets

LIQUID EJECTING APPARATUS AND METHOD FOR CONTROLLING LIQUID EJECTING APPARATUS

The present application is based on, and claims priority from JP Application Serial Number 2022-152382, filed Sep. 26, 2022, the disclosure of which is hereby incorporated by reference herein in its entirety.

BACKGROUND

1. Technical Field

The present disclosure relates to a liquid ejecting apparatus and a method for controlling a liquid ejecting apparatus.

2. Related Art

A liquid ejecting apparatus represented by an ink jet printer may have a configuration for circulating liquid such as ink in and outside a liquid ejecting head that ejects the liquid. For example, an apparatus described in JP-A-2021-187009 includes a head unit, a pump for supplying ink to the head unit, and a pump for discharging the ink from the head unit.

In the configuration for circulating liquid in and outside the liquid ejecting head as described above, a plurality of modes in which levels of pressure for supplying and discharging liquid to and from the liquid ejecting head are different may be switched. However, in an apparatus described in JP-A-2021-187009, an unintended change in pressure within a head may occur as switching is performed between modes, and as a result, ink may drip from a nozzle.

SUMMARY

In order to solve the problems described above, according to an aspect of the present disclosure, a liquid ejecting apparatus includes a liquid ejecting head that includes a plurality of individual flow paths including respective pressure chambers communicating with nozzles for ejecting liquid, a first common flow path commonly coupled to one ends of the individual flow paths, and a second common flow path commonly coupled to the other ends of the individual flow paths; a pressurizing mechanism that performs a pressurization operation for supplying the liquid to the first common flow path; a depressurizing mechanism that performs a depressurization operation for discharging the liquid from the second common flow path; and a mode controller that controls execution of a plurality of modes including a first mode in which an operation of the liquid ejecting head is controlled under pressurization at first pressure by the pressurizing mechanism and depressurization at second pressure by the depressurizing mechanism and a second mode in which the operation of the liquid ejecting head is controlled under pressurization at third pressure by the pressurizing mechanism and depressurization at fourth pressure by the depressurizing mechanism. To switch from the execution of the first mode to the execution of the second mode, the mode controller gradually changes, from the first pressure to the third pressure, pressure at which the pressurization operation is performed by the pressurizing mechanism, and gradually changes, from the second pressure to the fourth pressure, pressure at which the depressurization operation is performed by the depressurizing mechanism.

According to another aspect of the present disclosure, a method for controlling a liquid ejecting apparatus is provided. The liquid ejecting apparatus includes a liquid ejecting head that includes a plurality of individual flow paths including respective pressure chambers communicating with nozzles for ejecting liquid, a first common flow path commonly coupled to one ends of the individual flow paths, and a second common flow path commonly coupled to the other ends of the individual flow paths; a pressurizing mechanism that performs a pressurization operation for supplying the liquid to the first common flow path; and a depressurizing mechanism that performs a depressurization operation for discharging the liquid from the second common flow path. The method includes executing a first mode in which an operation of the liquid ejecting head is controlled under pressurization at first pressure by the pressurizing mechanism and depressurization at second pressure by the depressurizing mechanism; after executing the first mode, executing inter-mode pressure control to gradually change, from the first pressure to third pressure, pressure at which the pressurization operation is performed by the pressurizing mechanism, and gradually change, from the second pressure to fourth pressure, pressure at which the depressurization operation is performed by the depressurizing mechanism; and after executing the inter-mode pressure control, executing a second mode in which the operation of the liquid ejecting head is controlled under pressurization at the third pressure by the pressurizing mechanism and depressurization at the fourth pressure by the depressurizing mechanism.

DESCRIPTION OF EMBODIMENTS

Figure 1:
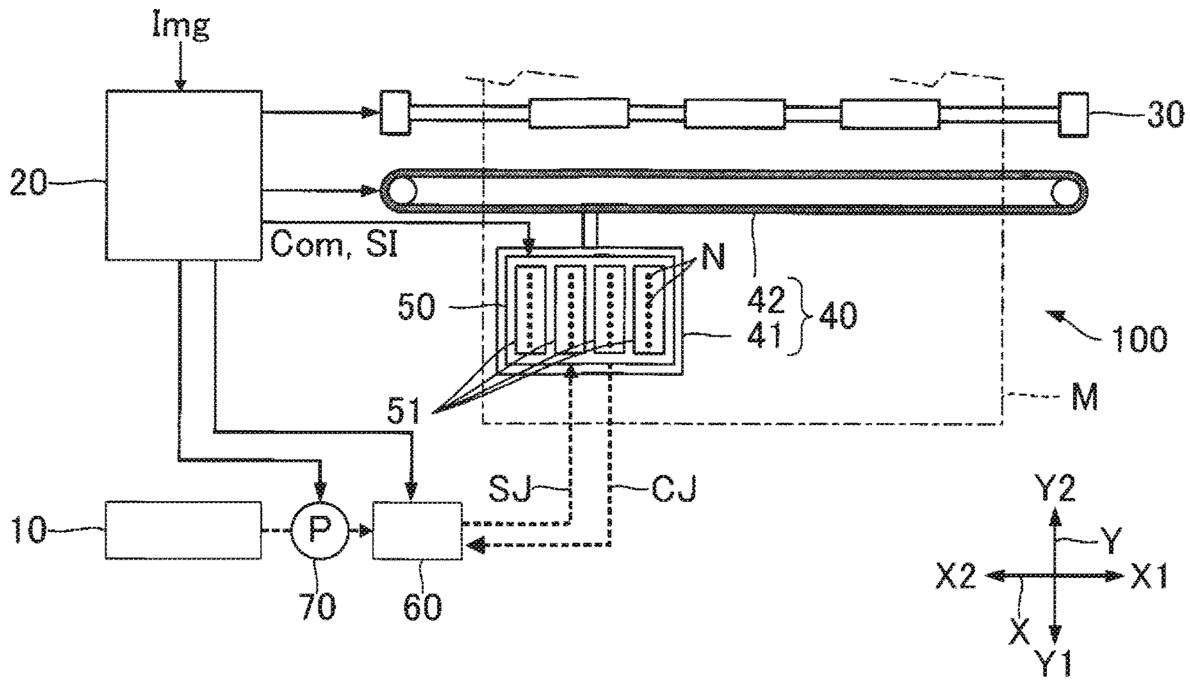
FIG. 1 is a schematic diagram illustrating an example of a configuration of a liquid ejecting apparatus according to a first embodiment.

Hereinafter, embodiments of the present disclosure are described with reference to the accompanying drawings. Dimensions and scale of components in the drawings are different from the actual dimensions and scale of the components, and some components are schematically illustrated in order to facilitate understanding. The scope of the present disclosure is not limited to the embodiments unless specifically stated to limit the present disclosure in the following description.

The following description will be made using an X axis, a Y axis, and a Z axis that intersect each other as appropriate for the sake of convenience. In the following description, one direction along the X axis is an X1 direction, and a direction that extends along the X axis and is opposite to the X1 direction is an X2 direction. Similarly, directions along the Y axis that are opposite to each other are a Y1 direction and a Y2 direction. In addition, directions along the Z axis that are opposite to each other are a Z1 direction and a Z2 direction.

In this case, typically, the Z axis is a vertical axis, and the Z2 direction corresponds to a downward direction in the vertical direction. However, the Z axis may not be the vertical direction. The X, Y and Z axes are typically perpendicular to each other, but may not be limited thereto. For example, the X, Y, and Z axes may intersect each other at an angle in a range of 80 degrees or greater to 100 degrees or less.

1. First Embodiment

1-1. Schematic Configuration of Liquid Ejecting Apparatus

FIG. 1 is a schematic diagram illustrating an example of a configuration of a liquid ejecting apparatus 100 according to a first embodiment. The liquid ejecting apparatus 100 is an ink jet printing apparatus that ejects ink as a droplet onto a medium M. The ink is an example of liquid. The medium M is typically printing paper. The medium M is not limited to printing paper and may be a resin film or a printing target object made of any material such as fabric, for example.

As illustrated in FIG. 1, the liquid ejecting apparatus 100 includes a liquid container 10, a control unit 20, a transport mechanism 30, a moving mechanism 40, a liquid ejecting head 50, a circulating mechanism 60, and a pump 70. The control unit 20 is an example of a “mode controller”. The liquid container 10, the control unit 20, the transport mechanism 30, the moving mechanism 40, the liquid ejecting head 50, the circulating mechanism 60, and the pump 70 are briefly described below in this order with reference to FIG. 1.

The liquid controller 10 stores ink. Specific examples of the liquid container 10 are a cartridge attachable to and detachable from the liquid ejecting apparatus 100, a bag-shaped ink pack formed of a flexible film, and an ink tank that can be refilled with ink.

The ink stored in the liquid container 10 is not particularly limited and may be, for example, water-based ink in which a coloring material such as a dye or a pigment is dissolved in a water-based solvent, solvent-based ink in which a coloring material is dissolved in an organic solvent, UV curable ink, clear ink, white ink, or treatment liquid. The clear ink does not contain a coloring material and is used to improve the abrasion resistance of a surface printed with a coloring material when the surface is overcoated with the clear ink, and to reduce unevenness caused by a pigment component so as to reduce color deviation caused by diffuse reflection. The white ink contains a white pigment or the like and is used to reduce the non-whiteness of the medium M caused by dirt of the medium M or the like. The treatment liquid is ink that has reactivity with a component contained in color ink and that contacts the color ink on the medium M to improve the fixability of the color ink. The liquid container 10 may include a plurality of containers for storing different types of ink for each of head chips 51 described later.

The control unit 20 includes a processing circuit such as a central processing unit (CPU) or a field programmable gate array (FPGA) and a storage circuit such as a semiconductor memory. The control unit 20 controls an operation of each of the components of the liquid ejecting apparatus 100. The control unit 20 switches a plurality of modes in which an operation of the liquid ejecting head 50 is controlled. The control unit 20 executes a mode among the plurality of modes.

The transport mechanism 30 transports the medium M in a transport direction DM under control by the control unit 20. In the example illustrated in FIG. 1, the transport direction DM is the Y1 direction. The moving mechanism 40 causes the liquid ejecting head 50 including the plurality of head chips 51 to reciprocate in the X1 direction and the X2 direction under control by the control unit 20. In the example illustrated in FIG. 1, the moving mechanism 40 includes a substantially box-shaped transport body 41 and a transport belt 42 to which the transport body 41 is fixed. The transport body 41 is also referred to as a carriage for storing the liquid ejecting head 50. Not only the liquid ejecting head 50 including the plurality of head chips 51 but also a portion of the circulating mechanism 60 may be mounted on the transport body 41.

The liquid ejecting head 50 ejects, from a plurality of nozzles N toward the Z2 direction, the ink supplied from the liquid container 10 through the pump 70 and the circulating mechanism 60 to the liquid ejecting head 50 in this order onto the medium M under control by the control unit 20. The ejection is performed in parallel with the transport of the medium M by the transport mechanism 30 and the reciprocation of the liquid ejecting head 50 by the moving mechanism 40 so as to form an image of the ink on a surface of the medium M.

In this case, a drive signal Com for driving the liquid ejecting head 50 and a control signal SI for controlling the driving of the liquid ejecting head 50 are supplied to the liquid ejecting head 50 from the control unit 20. The control signal SI is a signal for specifying whether the drive signal Com is supplied to piezoelectric elements 51*e* of the liquid ejecting head 50. The piezoelectric elements 51*e* are described later. The control signal SI is generated based on image data Img. The image data Img is information indicating an image and is supplied to the control unit 20 from a host computer such as a personal computer or a digital camera.

In the example illustrated in FIG. 1, the liquid ejecting head 50 includes the plurality of head chips 51. Each of the head chips 51 is coupled to a supply flow path SJ and a collection flow path CJ via a flow path of a flow path structure not illustrated. The head chips 51 are described later with reference to FIGS. 3 and 4. The number of head chips 51 included in the liquid ejecting head 50 is not limited to that in the example illustrated in FIG. 1 and may be any number or one.

In the example illustrated in FIG. 1, the liquid container 10 is coupled to the liquid ejecting head 50 via the pump 70 and the circulating mechanism 60 in this order. The circulating mechanism 60 supplies the ink to the liquid ejecting head 50 through the supply flow path SJ under control by the control unit 20 and collects the ink discharged from the liquid ejecting head 50 through the collection flow path CJ for resupply of the ink to the liquid ejecting head 50 under control by the control unit 20. The operation of the circulating mechanism 60 can suppress an increase in the viscosity of the ink and reduce retention of air bubbles in the ink. Each of the supply flow path SJ and the collection flow path CJ is formed of, for example, a flexible tube. A specific example of the configuration of the circulating mechanism 60 is described later with reference to FIG. 2.

The pump 70 supplies the ink stored in the liquid container 10 to the circulating mechanism 60 under control by the control unit 20. The pump 70 is, for example, a tube pump. The pump 70 is not limited to a tube pump and may be a diaphragm pump or a syringe pump, for example.

1-2. Configuration of Circulating Mechanism

Figure 2:
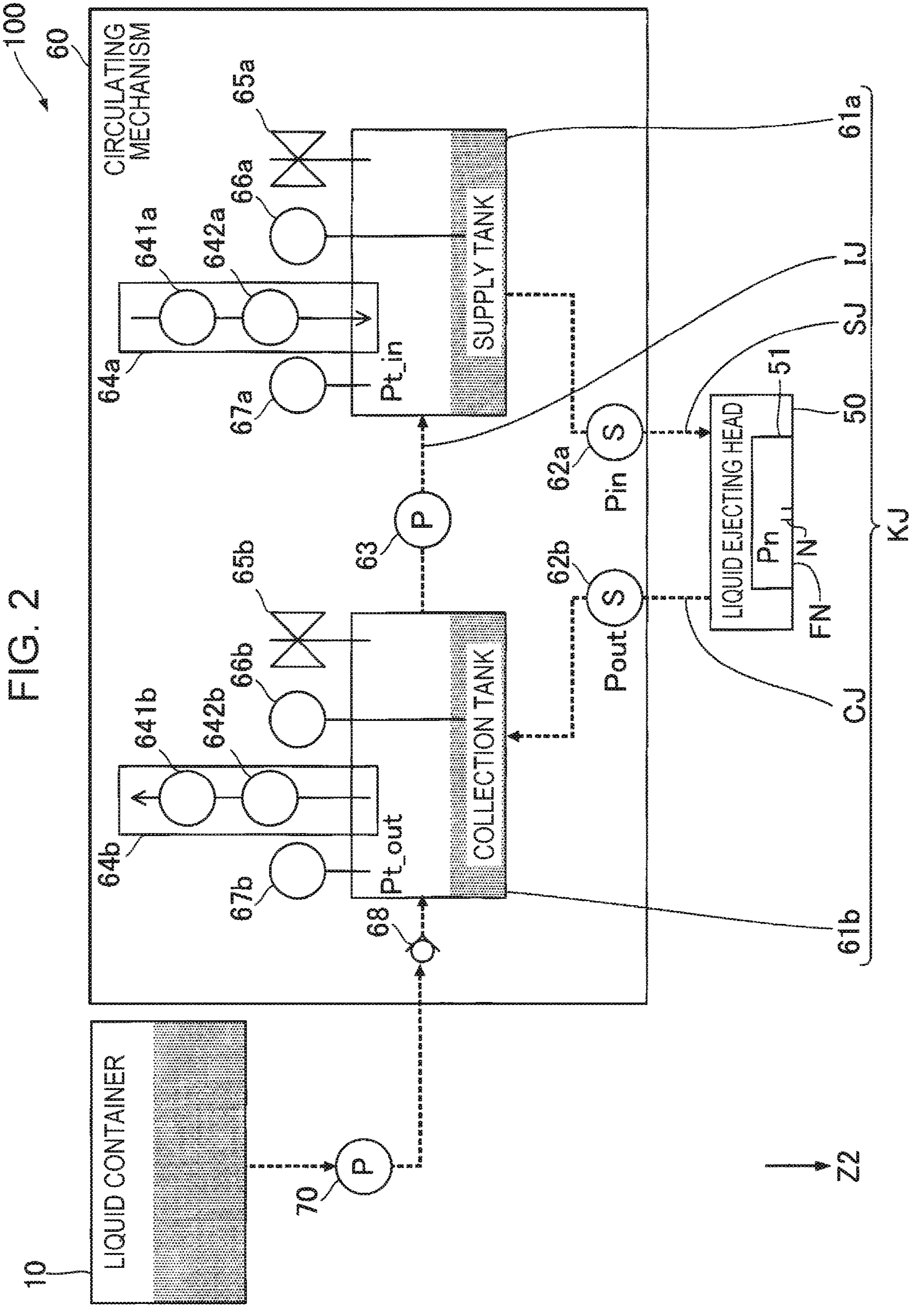
FIG. 2 is a diagram for explaining a circulating mechanism.

FIG. 2 is a diagram for explaining the circulating mechanism 60. As illustrated in FIG. 2, the circulating mechanism 60 includes a supply tank 61*a*, a collection tank 61*b*, a pressure sensor 62*a*, a pressure sensor 62*b*, a return pump 63, a pressurizing mechanism 64*a*, a depressurizing mechanism 64*b*, opening/closing valves 65*a* and 65*b*, liquid surface sensors 66*a* and 66*b*, pressure sensors 67*a* and 67*b*, and a check valve 68. The pressure sensor 62*a* is an example of a "first detector". The pressure sensor 62*b* is an example of a "second detector".

The supply tank 61*a* is a container for temporarily storing the ink to be supplied to the liquid ejecting head 50. The supply tank 61*a* is coupled to the liquid ejecting head 50 via the supply flow path SJ. The ink stored in the supply tank 61*a* is supplied to the liquid ejecting head 50 through the supply flow path SJ. The supply tank 61*a* is coupled to the collection tank 61*b* via an intermediate flow path IJ and receives the ink from the collection tank 61*b* through the intermediate flow path IJ.

The pressure sensor 62*a* is disposed in the middle of the supply flow path SJ. The pressure sensor 62*a* measures pressure Pin between the pressurizing mechanism 64*a* and the liquid ejecting head 50 and measures pressure within the supply flow path SJ. The pressure sensor 62*a* is not particularly limited. For example, as the pressure sensor 62*a*, a known diaphragm pressure sensor can be used. Information indicating the results of the measurement by the pressure sensor 62*a* is input to the control unit 20.

The return pump 63 is disposed in the middle of the intermediate flow path IJ. The return pump 63 generates pressure for sending the ink to the supply tank 61*a* from the collection tank 61*b* under control by the control unit 20. The return pump 63 is, for example, a tube pump.

The supply tank 61*a* is provided with the pressurizing mechanism 64*a*, the opening/closing valve 65*a*, the liquid surface sensor 66*a*, and the pressure sensor 67*a*.

The pressurizing mechanism 64*a* pressurizes the inside of the supply tank 61*a* and performs a pressurization operation for supplying the ink to a first common liquid chamber R1. In the example illustrated in FIG. 2, the pressurizing mechanism 64*a* includes a compressor 641*a* and a regulator 642*a*. The compressor 641*a* generates positive pressure higher than the atmospheric pressure. The regulator 642*a* is disposed between the compressor 641*a* and the supply tank 61*a*. The regulator 642*a* adjusts the pressure generated by the compressor 641*a* and supplies the adjusted pressure to the supply tank 61*a* under control by the control unit 20. The pressurizing mechanism 64*a* may include a pump such as a tube pump, a syringe pump, or a diaphragm pump, instead of the compressor 641*a*.

The opening/closing valve 65*a* is a valve mechanism that is opened and closed between the inside of the supply tank 61*a* and an external space under control by the control unit 20. When the opening/closing valve 65*a* is in an opened state, the inside of the supply tank 61*a* is opened to the atmosphere. On the other hand, when the opening/closing valve 65*a* is in a closed state, the inside of the supply tank 61*a* is sealed. The opening/closing valve 65*a* is, for example, a valve that can be controlled by a device such as the control unit 20. The opening/closing valve 65*a* is, for example, a diaphragm valve, a solenoid valve, an electric valve, or the like.

The liquid surface sensor 66*a* detects whether the liquid surface of the ink within the supply tank 61*a* is at a predetermined height position or higher. The liquid surface sensor 66*a* is not particularly limited. For example, as the liquid surface sensor 66*a*, a known contact or non-contact liquid surface sensor can be used. Information indicating the result of the detection by the liquid surface sensor 66*a* is input to the control unit 20.

The pressure sensor 67*a* measures pressure Pt_in within the supply tank 61*a*. The pressure sensor 67*a* is not particularly limited. For example, as the pressure sensor 67*a*, a known diaphragm pressure sensor can be used. Information indicating the result of the measurement by the pressure sensor 67*a* is input to the control unit 20.

The collection tank 61*b* is a container for temporarily storing the ink discharged from the liquid ejecting head 50. The collection tank 61*b* is coupled to the liquid ejecting head 50 via the collection flow path CJ and receives the ink collected from the liquid ejecting head 50 through the collection flow path CJ. The collection tank 61*b* communicates with the liquid container 10 via the pump 70 and receives the ink supplied from the liquid container 10.

The pressure sensor 62*b* is disposed in the middle of the collection flow path CJ. The pressure sensor 62*b* measures pressure Pout between the depressurizing mechanism 64*b* and the liquid ejecting head 50 and measures pressure within the collection flow path CJ. The pressure sensor 62*b* is not particularly limited. For example, as the pressure sensor 62*b*, a known diaphragm pressure sensor can be used. Information indicating the results of the measurement by the pressure sensor 62*b* is input to the control unit 20. The check valve 68 is disposed between the collection tank 61*b* and the pump 70. The check valve 68 suppresses the backflow of the ink supplied from the liquid container 10 toward the collection tank 61*b*.

The collection tank 61*b* is provided with the depressurizing mechanism 64*b*, the opening/closing valve 65*b*, the liquid surface sensor 66*b*, and the pressure sensor 67*b*.

The depressurizing mechanism 64*b* depressurizes the inside of the collection tank 61*b* and performs a depressurization operation for discharging the ink from a second common liquid chamber R2. In the example illustrated in FIG. 2, the depressurizing mechanism 64*b* includes a vacuum pump 641*b* and a regulator 642*b*. The vacuum pump 641*b* generates negative pressure lower than the atmospheric pressure. The regulator 642*b* is disposed between the vacuum pump 641*b* and the collection tank 61*b*. The regulator 642*b* adjusts the pressure generated by the vacuum pump 641*b* and supplies the adjusted pressure to the collection tank 61*b* under control by the control unit 20.

The opening/closing valve 65*b* is a valve mechanism that is opened and closed between the inside of the collection tank 61*b* and an external space under control by the control unit 20. When the opening/closing valve 65*b* is in an opened state, the inside of the collection tank 61*b* is opened to the atmosphere. On the other hand, when the opening/closing valve 65*b* is in a closed state, the inside of the collection tank 61*b* is sealed. The opening/closing valve 65*b* is, for example, a valve that can be controlled by a device such as the control unit 20. The opening/closing valve 65*b* is, for example, a diaphragm valve, a solenoid valve, an electric valve, or the like.

The liquid surface sensor 66*b* detects whether the liquid surface of the ink within the collection tank 61*b* is at a predetermined height position or higher. The liquid surface sensor 66*b* is not particularly limited. For example, as the liquid surface sensor 66*b*, a known contact or non-contact liquid sensor can be used. Information indicating the result of the detection by the liquid surface sensor 66*b* is input to the control unit 20.

The pressure sensor 67*b* measures pressure Pt_out within the collection tank 61*b*. The pressure sensor 67*b* is not particularly limited. For example, as the pressure sensor 67*b*, a known diaphragm pressure sensor can be used. Information indicating the result of the measurement by the pressure sensor 67*b* is input to the control unit 20.

The circulating mechanism 60 described above sets the pressure Pt_in within the supply tank 61*a* to a level higher than the pressure Pt_out within the collection tank 61*b* under control by the control unit 20 so as to circulate the ink in a circulation path KJ including the liquid ejecting head 50, the supply tank 61*a*, the supply flow path SJ, the collection tank 61*b*, the collection flow path CJ, and the intermediate flow path IJ. In this case, the ink flows from the supply tank 61*a* through the supply flow path SJ into the liquid ejecting head 50 and is collected into the collection tank 61*b* from the liquid ejecting head 50 through the collection flow path CJ. In addition, when needed, the ink is sent from the collection tank 61*b* through the intermediate flow path IJ to the supply tank 61*a* by the operation of the return pump 63.

The control unit 20 controls the operation of the pressurizing mechanism 64*a* and the operation of the depressurizing mechanism 64*b* based on the results of the detection by the pressure sensors 62*a* and 62*b* such that the pressure Pn within the liquid ejecting head 50 is maintained at a negative pressure level in a predetermined range. Since the pressure Pn is maintained at the negative pressure level in the predetermined range, the meniscus of the ink in the nozzles N is prevented from being broken and the ink is prevented from dripping from the nozzles N. This control is described later in detail with reference to FIGS. 6 to 9.

1-3. Configuration of Each Head Chip

Figure 3:
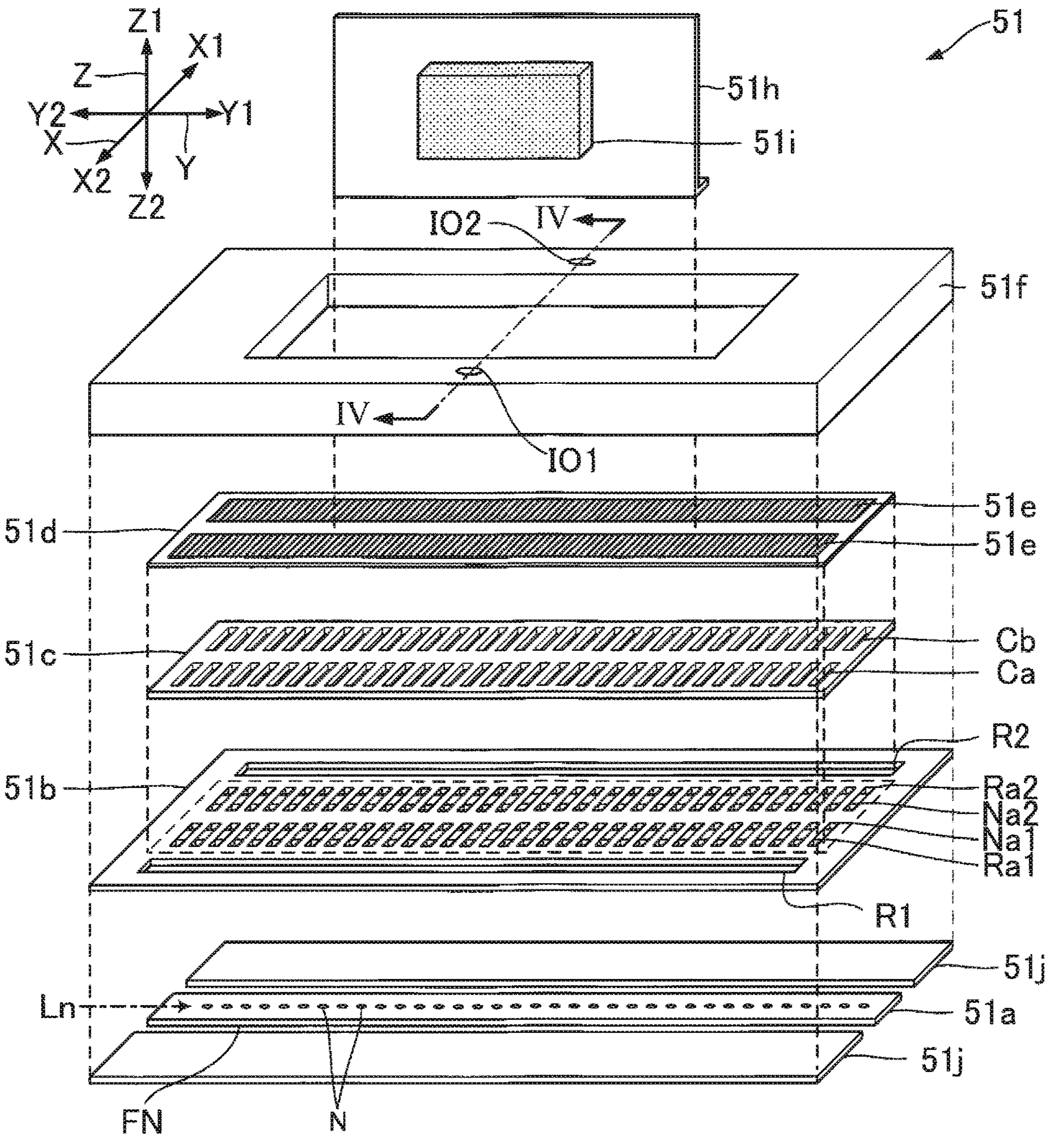
FIG. 3 is a disassembled perspective view of one of head chips of a liquid ejecting head.
Figure 4:
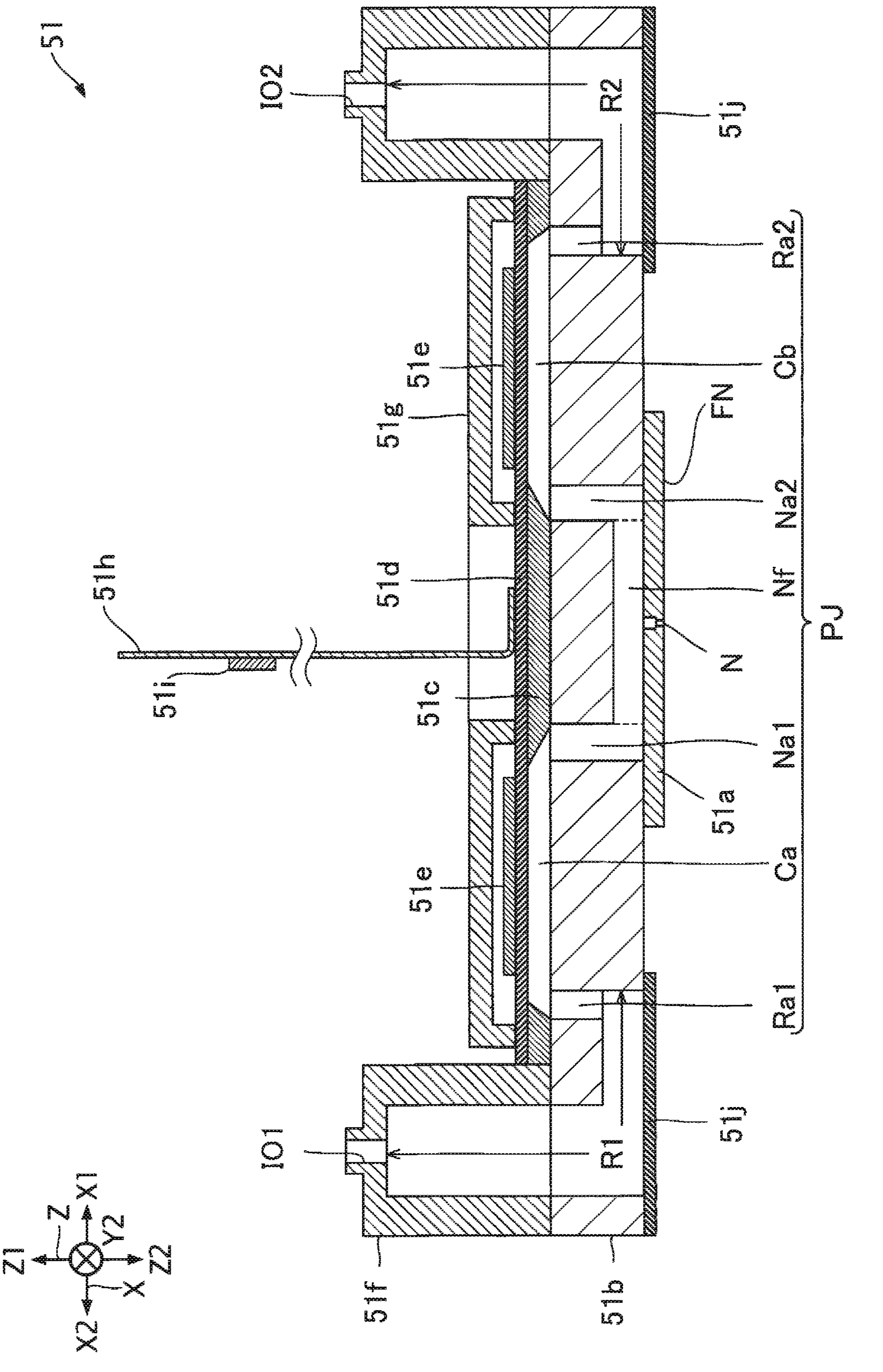
FIG. 4 is a cross-sectional view taken along line IV-IV illustrated in FIG. 3.

FIG. 3 is a disassembled perspective view of one of the head chips 51 of the liquid ejecting head 50. FIG. 4 is a cross-sectional view taken along line IV-IV illustrated in FIG. 3. Line IV-IV illustrated in FIG. 3 is a virtual line segment parallel to the X axis and extending through a nozzle flow path Nf.

As illustrated in FIGS. 3 and 4, the head chip 51 has a plurality of nozzles N, a plurality of individual flow paths PJ, the first common liquid chamber R1, and the second common liquid chamber R2. The first common liquid chamber R1 and the second common liquid chamber R2 communicate with each other via the plurality of individual flow paths PJ. Each of the individual flow paths PJ includes a pressure chamber Ca, a pressure chamber Cb, a nozzle flow path Nf, an individual supply flow path Ra1, an individual discharge flow path Ra2, a first communication flow path Na1, and a second communication flow path Na2.

The head chip 51 includes a nozzle substrate 51*a*, a flow path substrate 51*b*, a pressure chamber substrate 51*c*, a vibration plate 51*d*, a plurality of piezoelectric elements 51*e*, a casing 51*f*, a protective plate 51*g*, a wiring substrate 51*h*, and a vibration absorber 51*j*.

As illustrated in FIGS. 3 and 4, the nozzle substrate 51*a*, the flow path substrate 51*b*, the pressure chamber substrate 51*c*, and the vibration plate 51*d* are stacked in this order in the Z1 direction. Each of the members 51*a*, 51*b*, 51*c*, and 51*d* extends along the Y axis and is formed by, for example, using a semiconductor processing technique to process a silicon monocrystalline substrate. The members 51*a*, 51*b*, 51*c*, and 51*d* are bonded to each other via an adhesive or the like. Another layer such as an adhesive layer or a substrate may be interposed between two adjacent members among the members 51*a*, 51*b*, 51*c*, and 51*d*.

In the nozzle substrate 51*a*, a plurality of nozzles N are formed. Each of the nozzles N is a through-hole through which ink passes. The nozzles N penetrate through the nozzle substrate 51*a*. The plurality of nozzles N are arrayed in the direction along the Y axis and form a nozzle array Ln. A surface of the nozzle substrate 51*a* facing toward the Z2 direction is a nozzle surface FN.

In the flow path substrate 51*b*, a portion of the first common liquid chamber R1, a portion of the second common liquid chamber R2, and portions of the individual flow paths PJ excluding the pressure chambers Ca and the pressure chambers Cb are disposed. That is, in the flow path substrate 51*b*, the nozzle flow paths Nf, the first communication flow paths Na1, the second communication flow paths Na2, the individual supply flow paths Ra1, and the individual discharge flow paths Ra2 are disposed. Each of the pressure chambers Ca and the pressure chambers Cb may be hereinafter referred to as a pressure chamber C.

The portion of the first common liquid chamber R1 and the portion of the second common liquid chamber R2 are spaces penetrating through the flow path substrate 51*b*. On a surface of the flow path substrate 51*b* facing toward the Z2 direction, the vibration absorber 51*j* closing openings of the spaces is disposed.

The vibration absorber 51*j* is a sheet-like member made of an elastic material. The vibration absorber 51*j* forms a portion of a wall surface of each of the first common liquid chamber R1 and the second common liquid chamber R2 and reduces a change in pressure within the first common liquid chamber R1 and a change in pressure within the second common liquid chamber R2.

The nozzle flow paths Nf are spaces within grooves disposed in the surface of the flow path substrate 51*b* facing toward the Z2 direction. The nozzle substrate 51*a* forms portions of wall surfaces of the nozzle flow paths Nf.

Each of the first communication flow paths Na1 and the second communication flow paths Na2 is a space penetrating through the flow path substrate 51*b*.

Each of the individual supply flow paths Ra1 and the individual discharge flow paths Ra2 is a space penetrating through the flow path substrate 51*b*. The first common liquid chamber R1 communicates with the pressure chambers Ca via the individual supply flow paths Ra1. The ink is supplied from the first common liquid chamber R1 to the pressure chambers Ca through the individual supply flow paths Ra1. One ends of the individual supply flow paths Ra1 are open to a surface of the flow path substrate 51*b* facing toward the Z1 direction. The other ends of the individual supply flow paths Ra1 are ends of the individual flow paths RJ located upstream and are openings of a wall surface of the first common liquid chamber R1 in the flow path substrate 51*b*.

The second common liquid chamber R2 communicates with the pressure chambers Cb via the individual discharge flow paths Ra2. The ink is discharged from the pressure chambers Cb into the second common liquid chamber R2 through the individual discharge flow paths Ra2. One ends of the individual discharge flow paths Ra2 are open to the surface of the flow path substrate 51*b* facing toward the Z1 direction. The other ends of the individual discharge flow paths Ra2 are ends of the individual flow paths PJ located downstream and are openings of a wall surface of the second common liquid chamber R2 in the flow path substrate 51*b*.

In the pressure chamber substrate 51*c*, the pressure chambers Ca and the pressure chambers Cb of the plurality of individual flow paths PJ are disposed. Each of the pressure chambers Ca and the pressure chambers Cb penetrates through the pressure chamber substrate 51*c* and is a gap between the flow path substrate 51*b* and the vibration plate 51*d*.

The vibration plate 51*d* is a plate-like member that can elastically vibrate. The vibration plate 51*d* is, for example, a stacked body including a first layer made of silicon oxide and a second layer made of zirconium oxide. Another layer made of metal oxide or the like may be interposed between the first layer and the second layer. A part or all of the vibration plate 51*d* may be made of the same material as that of the pressure chamber substrate 51*c* and integrated with the pressure chamber substrate 51*c*. For example, the vibration plate 51*d* and the pressure chamber substrate 51*c* can be integrally formed by selectively removing a portion extending in a thickness direction and included in a region included in a plate-like member with a predetermined thickness and corresponding to the pressure chambers C. The vibration plate 51*d* may be a layer made of a single material.

On a surface of the vibration plate 51*d* facing toward the Z1 direction, the plurality of piezoelectric elements 51*e* corresponding to the different pressure chambers C are disposed. Each of the piezoelectric elements 51*e* is formed by stacking a first electrode, a piezoelectric layer, and a second electrode facing the first electrode. The piezoelectric layer is disposed between the first electrode and the second electrode. Each of the piezoelectric elements 51*e* changes pressure applied to ink within the corresponding pressure chamber C so as to eject the ink within the corresponding pressure chamber C from the corresponding nozzle N. When a drive signal Com is supplied to the piezoelectric element 51*e*, the piezoelectric element 51 deforms to vibrate the vibration plate 51*d*. Due to the vibration of the vibration plate 51*d*, the pressure chamber C expands and contracts so as to change pressure applied to the ink within the pressure chamber C. Each of the piezoelectric elements 51*e* is an example of a drive element. However, the head chip 51 may include heating elements instead of the piezoelectric elements 51*e*.

The casing 51*f* stores the ink. While a portion of the first common liquid chamber R1 and a portion of the second common liquid chamber R2 are formed in the flow path substrate 51*b*, the casing 51*f* has spaces that form the other portion of the first common liquid chamber R1 and the other portion of the second common liquid chamber R2. In addition, the casing 51*f* includes an introduction port IO1 communicating with the first common liquid chamber R1 and a discharge port 102 communicating with the second common liquid chamber R2. The ink is supplied into the first common liquid chamber R1 through the introduction port IO1. In addition, the ink stored in the second common liquid chamber R2 is collected through the discharge port 102 into the collection tank 61*b*.

The protective plate 51*g* is a plate-like member disposed on the surface of the vibration plate 51*d* facing toward the Z1 direction. The protective plate 51*g* protects the plurality of piezoelectric elements 51*e* and reinforces mechanical strength of the vibration plate 51*d*. Between the protective plate 51*g* and the vibration plate 51*d*, spaces in which the plurality of piezoelectric elements 51*e* are disposed are formed.

The wiring substrate 51*h* is mounted on the surface of the vibration plate 51*d* facing toward the Z1 direction and is a mounting component for electrically coupling the control unit 20 to the head chips 51. For example, a flexible printed circuit (FPC), a flexible flat cable (FFC), or the like is used as the wiring substrate 51*h* having flexibility. A drive circuit 51*i* is mounted on the wiring substrate 51*h*. The drive circuit 51*i* includes a switching element that switches whether to supply, as a drive pulse, at least a part of a waveform included in the drive signal Com based on the control signal SI.

In the head chip 51 having the above-described configuration, the ink flows through the first common liquid chamber R1, the individual supply flow paths Ra1, the pressure chambers Ca, the nozzle flow paths Nf, the pressure chambers Cb, the individual discharge flow paths Ra2, and the second common liquid chamber R2 in this order by the operation of the circulating mechanism 60 described above.

The piezoelectric elements 51*e* corresponding to the pressure chambers Ca and the pressure chambers Cb are simultaneously driven by the drive signal Com from the drive circuit 51*i* so as to change pressure within the pressure chambers Ca and the pressure chambers Cb and eject the ink from the nozzles N due to the changes in the pressure.

1-4. Operation of Liquid Ejecting Apparatus

Figure 5:
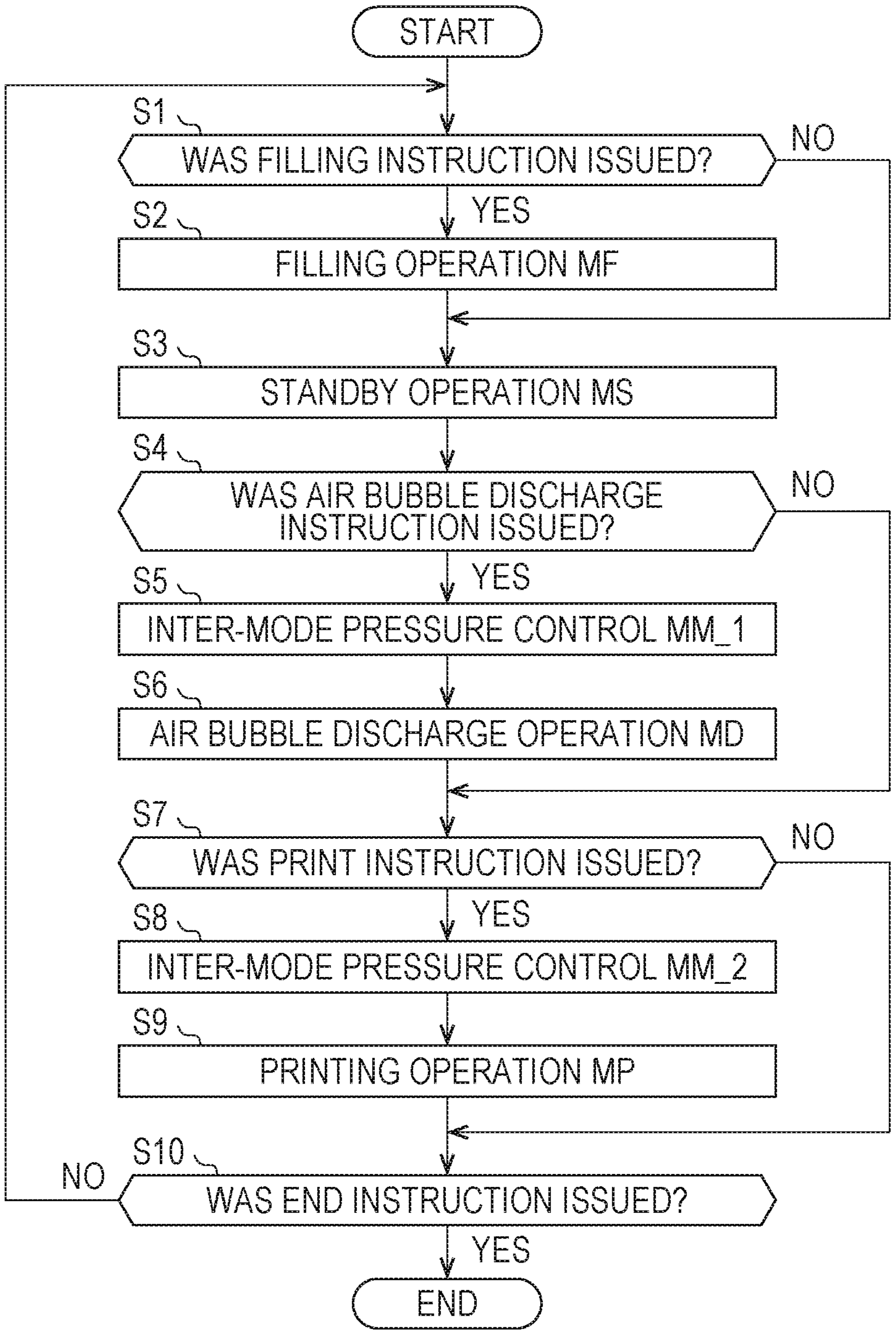
FIG. 5 is a flowchart illustrating an example of a procedure of an operation of the liquid ejecting apparatus according to the first embodiment.

FIG. 5 is a diagram illustrating an example of a procedure of the operation of the liquid ejecting apparatus 100 according to the first embodiment. As illustrated in FIG. 5, in the liquid ejecting apparatus 100, in step S1, the control unit 20 determines whether a filling instruction was issued. For example, when the liquid ejecting head 50 is replaced, the operation of the liquid ejecting apparatus 100 is the first operation, or a filling instruction based on an input result of an input device not illustrated is issued, the control unit 20 determines that the filling instruction was issued. In this case, whether the liquid ejecting head 50 was replaced is determined based on, for example, a result of detecting the detachment of the liquid ejecting head 50 by a sensor.

When the control unit 20 determines that the filling instruction was issued (YES in step S1), the control unit 20 executes a filling operation MF in step S2. The filling operation MF is a mode that starts to be executed in a state in which the inside of the liquid ejecting head 50 is not filled with the ink. In the filling operation MF, the pressurizing mechanism 64*a* is operated over a predetermined time period in a state in which the opening/closing valve 65*a* is closed. In the predetermined time period, the control unit 20 does not drive the liquid ejecting head 50. In addition, in the predetermined time period, the control unit 20 may operate the depressurizing mechanism 64*b* over a predetermined time period or may operate the return pump 63 in a state in which the opening/closing valve 65*b* is closed. When the control unit 20 operates the depressurizing mechanism 64*b* in the predetermined time period, the timing of closing the opening/closing valves 65*a* and 65*b* and the timing of starting driving the return pump 63, the pressurizing mechanism 64*a*, and the depressurizing mechanism 64*b* are not particularly limited and may be the same or different. For example, in a state in which the opening/closing valve 65*b* is opened and the opening/closing valve 65*a* is closed, it is possible to start driving the return pump 63 and the pressurizing mechanism 64*a*. Thereafter, in a state in which the opening/closing valve 65*b* is closed, it is possible to start driving the depressurizing mechanism 64*b*. It is particularly preferable that these timings be the same in order to easily control the pressure Pn within the liquid ejecting head 50.

After step S2 or when the control unit 20 determines that the filling instruction was not issued (NO in step S1), the control unit 20 executes a standby operation MS in step S3. In the standby operation MS, the circulating mechanism 60 is operated under a predetermined condition in a state in which the liquid ejecting head 50 is not operated. Before the filling operation MF is executed, the standby operation MS is initially executed in a state in which the inside of the liquid ejecting head 50 is not filled with the ink. On the other hand, after the filling operation MF is executed, the standby operation MS is executed in a state in which the inside of the liquid ejecting head 50 is filled with the ink. In this case, the standby operation MS is a mode for standing by in a state in which the inside of the liquid ejecting head 50 is filled with the ink. The standby operation MS that is executed in a state in which the inside of the liquid ejecting head 50 is not filled with the ink may be hereinafter referred to as a standby operation MS_0 to distinguish this standby operation MS_0 from other standby operations MS_1 and MS_2 described later.

After step S3, the control unit 20 determines whether an air bubble discharge instruction was issued in step S4. For example, when the current time is immediately after the filling operation MF, or when an air bubble discharge instruction based on an input result of an input device not illustrated is issued, the control unit 20 determines that the air bubble discharge instruction was issued.

When the control unit 20 determines that the air bubble discharge instruction was issued (YES in step S4), the control unit 20 executes inter-mode pressure control MM_1 in step S5 and executes an air bubble discharge operation MD in step S6 after the execution of the inter-mode pressure control MM_1. The inter-mode pressure control MM_1 is a mode for gradually changing the pressure Pin at which the pressurization operation is performed by the pressurizing mechanism 64*a* and gradually changing the pressure Pout at which the depressurization operation is performed by the depressurizing mechanism 64*b* for switching from the execution of the standby operation MS_1 to the execution of the air bubble discharge operation MD. The inter-mode pressure control MM_1 is executed in a state in which the inside of the liquid ejecting head 50 is filled with the ink. The air bubble discharge operation MD is a mode for discharging an air bubble within the liquid ejecting head 50. The air bubble discharge operation MD is executed in a state in which the inside of the liquid ejecting head 50 is filled with the ink. In each of the inter-mode pressure control MM_1 and the air bubble discharge operation MD, the circulating mechanism 60 is operated under a predetermined condition in a state in which the liquid ejecting head 50 is not operated. The inter-mode pressure control MM_1 and the air bubble discharge operation MD are described in detail later with reference to FIGS. 6 to 9.

After step S6 or when the control unit 20 determines that the air bubble discharge instruction was not issued (NO in step S4), the control unit 20 determines whether a print instruction was issued in step S7. For example, when a print job is input, the head control unit 20 determines that the print instruction was issued.

When the head control unit 20 determines that the print instruction was issued (YES in step S7), the control unit 20 executes inter-mode pressure control MM_2 in step S8 and executes a printing operation MP in step S9 after the execution of the inter-mode pressure control MM_2. The inter-mode pressure control MM_2 is a mode for gradually changing the pressure Pin at which the pressurization operation is performed by the pressurizing mechanism 64*a* and gradually changing the pressure Pout at which the depressurization operation is performed by the depressurizing mechanism 64*b* for switching from the execution of the air bubble discharge operation MD to the execution of the printing operation MP. The inter-mode pressure control MM_2 is executed in a state in which the inside of the liquid ejecting head 50 is filled with the ink. The inter-mode pressure control MM_2 in step S8 is executed in the same manner as the inter-mode pressure control MM_1 in step S5, except that target values of the pressure Pin and Pout in the inter-mode pressure control MM_2 are different from target values of the pressure Pin and Pout in the inter-mode pressure control MM_1. The printing operation MP is a mode for performing printing by ejecting ink from the liquid ejecting head 50. The printing operation MP is executed in a state in which the inside of the liquid ejecting head 50 is filled with the ink. In the printing operation MP, the liquid ejecting head 50 is operated based on the image data Img in a state in which the circulating mechanism 60 is operated under a predetermined condition. Each of the inter-mode pressure control MM_1 and the inter-mode pressure control MM_2 may be hereinafter referred to as inter-mode pressure control MM.

After step S9 or when the head control unit 20 determines that the print instruction was not issued (NO in step S7), the control unit 20 determines whether an end instruction was issued in step S10. For example, when an end instruction based on an input result of an input device not illustrated is issued, the control unit 20 determines that the end instruction was issued.

When the head control unit 20 determines that the end instruction was not issued (NO in step S10), the control unit 20 causes the process to return to step S1. On the other hand, when the head control unit 20 determines that the end instruction was issued (YES in step S10), the control unit 20 ends the process.

As described above, the control unit 20 controls the execution of a plurality of modes including the filling operation MF, the standby operation MS, the inter-mode pressure control MM, the air bubble discharge operation MD, and the printing operation MP.

To switch from the execution of the standby operation MS_1 to the execution of the air bubble discharge operation MD, the control unit 20 executes the inter-mode pressure control MM_1 between the standby operation MS_1 and the air bubble discharge operation MD. In this case, the standby operation MS_1 is an example of a "first mode" and the air bubble discharge operation MD is an example of a "second mode". In addition, to switch from the execution of the air bubble discharge operation MD to the execution of the printing operation MP, the control unit 20 executes the inter-mode pressure control MM_2 between the air bubble discharge operation MD and the printing operation MP. In this case, the air bubble discharge operation MD is an example of the "first mode" and the printing operation MP is an example of the "second mode".

Furthermore, when the control unit 20 switches from the execution of the standby operation MS_0 to the execution of the filling operation MF, the standby operation MS_0 is an example of a "third mode" and the filling operation MF is an example of a "fourth mode".

Furthermore, when the control unit 20 switches from the execution of the printing operation MP to the execution of the standby operation MS_2, the printing operation MP is an example of a "fifth mode" and the standby operation MS_2 is an example of a "sixth mode".

Figure 6:
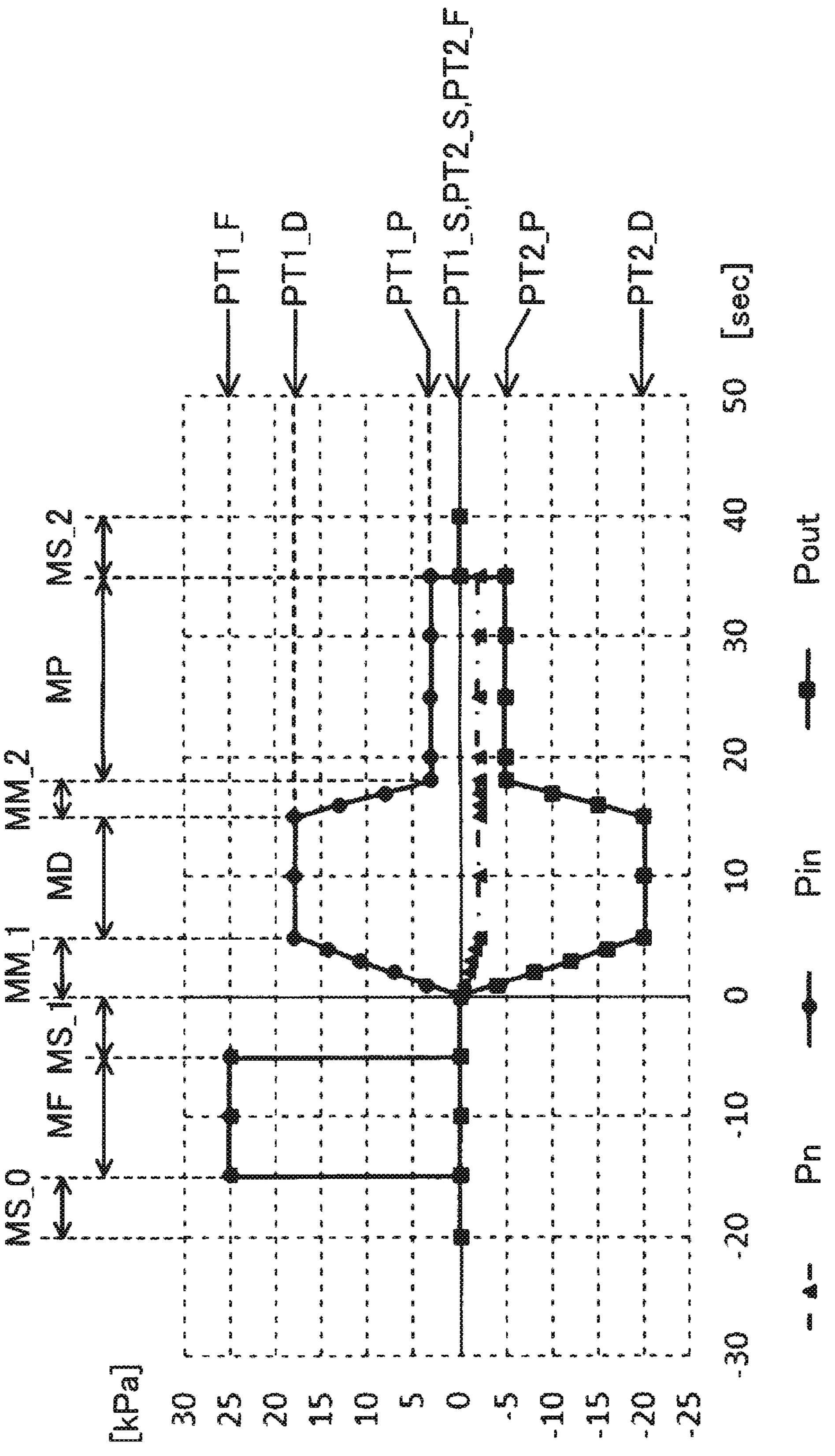
FIG. 6 is a diagram illustrating an example of changes in pressure in components over time according to the first embodiment.
Figure 7:
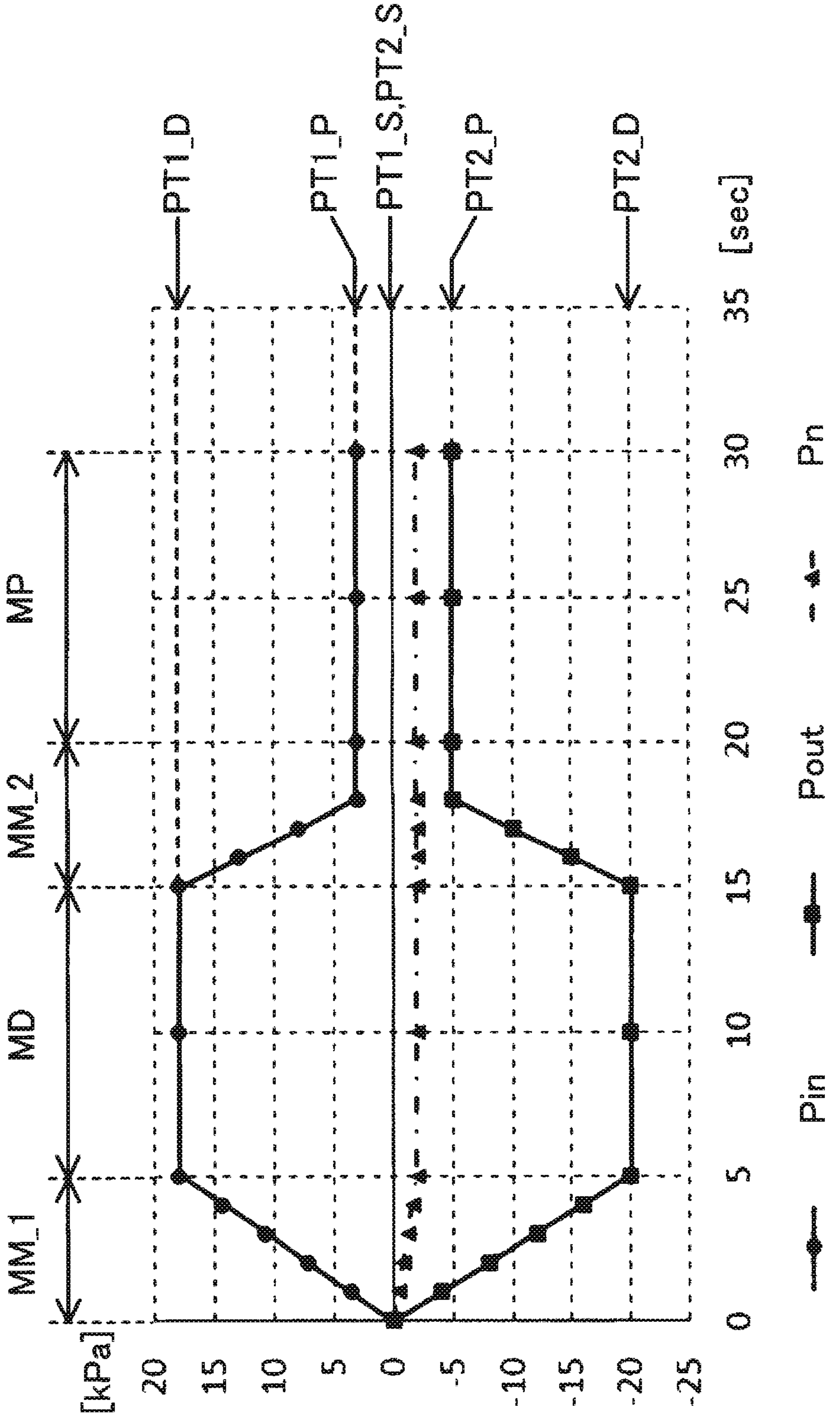
FIG. 7 is a diagram illustrating an example of changes in pressure in the components over time according to the first embodiment.

FIGS. 6 and 7 are diagrams illustrating an example of changes in the pressure Pin, Pout, and Pn in the components over time in the first embodiment. FIG. 6 illustrates changes in the pressure Pin, Pout, and Pin over time when the standby operation MS_0, the filling operation MF, the standby operation MS_1, the inter-mode pressure control MM_1, the air bubble discharge operation MD, the inter-mode pressure control MM_2, the printing operation MP, and the standby operation MS_2 are executed in this order. In FIG. 6 and the following description, the timing of starting the inter-mode pressure control MM_1 after the end of the standby operation MS_1 is a reference timing (0 sec). FIG. 7 illustrates changes in the pressure Pin, Pout, and Pn illustrated in FIG. 6 in a time period from the start of the execution of the inter-mode pressure control MM_1 to the end of the execution of the printing operation MP.

As illustrated in FIG. 6, the standby operation MS_0 is executed to control the operation of the liquid ejecting head 50 under pressurization at pressure PT1_S by the pressurizing mechanism 64*a* and depressurization at pressure PT2_S by the depressurizing mechanism 64*b*. In this case, the pressure PT1_S is an example of "fifth pressure" and the pressure PT2_S is an example of "sixth pressure". In the example illustrated in FIG. 6, the pressure PT1_S and the pressure PT2_S are 0 kPa.

Similarly to the standby operation MS_0, after the execution of the filling operation MF, each of the standby operations MS_1 and MS_2 is executed to control the operation of the liquid ejecting head 50 under pressurization at the pressure PT1_S by the pressurizing mechanism 64*a* and depressurization at the pressure PT2_S by the depressurizing mechanism 64*b*. However, as described above, the execution of the standby operation MS_0 is started in a state in which the inside of the liquid ejecting head 50 is not filled with the ink, while the standby operations MS_1 and MS_2 are executed in a state in which the inside of the liquid ejecting head 50 is filled with the ink. In addition, in the standby operation MS_1 after the execution of the filling operation MF and before the execution of the air bubble discharge operation MD, the pressure PT1_S is an example of "first pressure" and the pressure PT2_S is an example of "second pressure". In addition, in the standby operation MS_2 after the execution of the printing operation MP, the pressure PT1_S is an example of "eleventh pressure" and the pressure PT2_S is an example of "twelfth pressure".

Each of the pressure PT1_S and the pressure PT2_S is not limited to the pressure in the example illustrated in FIG. 6. For example, the pressure PT1_S may be slightly negative and the pressure PT2_S may be slightly positive. The absolute value of the pressure PT1_S may be different from the absolute value of the pressure PT2_S. Lengths of time which the standby operations MS are executed are not limited to lengths of time in the example illustrated in FIG. 6 and may be arbitrary.

The filling operation MF is executed to control the operation of the liquid ejecting head 50 under pressurization at pressure PT1_F by the pressurizing mechanism 64*a* and depressurization at pressure PT2_F by the depressurizing mechanism 64*b*. In this case, the pressure PT1_F is an example of "seventh pressure" and the pressure PT2_F is an example of "eighth pressure".

The pressure PT1_F is higher than the pressure PT2_F. In the example illustrated in FIG. 6, the pressure PT1_F is 25 kPa and the pressure PT2_F is 0 kPa. The absolute value of the pressure PT1_F is larger than the absolute value of the pressure PT2_F.

Each of the pressure PT1_F and the pressure PT2_F is not limited to the pressure in the example illustrated in FIG. 6. For example, the pressure PT2_F may be negative, and the absolute value of the pressure PT1_F may be equal to the absolute value of the pressure PT2_F. A length of time which the filling operation MF is executed is not limited to a length of time in the example illustrated in FIG. 6 and may be arbitrary.

As described above, the execution of each of the standby operation MS_0 and the filling operation MF is started in a state in which the inside of the liquid ejecting head 50 is not filled with the ink. In a state in which the inside of the liquid ejecting head 50 is not filled with the ink, even when the operation of the pressurizing mechanism 64*a* and the operation of the depressurizing mechanism 64*b* are rapidly changed, the ink does not drip from the nozzles N.

To switch from the execution of the standby operation MS_0 to the execution of the filling operation MF, each of the pressure Pin at which the pressurization operation is performed by the pressurizing mechanism 64*a* and the pressure Pout at which the depressurization operation is performed by the depressurizing mechanism 64*b* is instantaneously changed in order to speed up the switching. Specifically, to switch from the execution of the standby operation MS_0 to the execution of the filling operation MF, the control unit 20 instantaneously changes, from the pressure PT1_S to the pressure PT1_F, the pressure Pin at which the pressurization operation is performed by the pressurizing mechanism 64*a*, and instantaneously changes, from the pressure PT2_S to the pressure PT2_F, the pressure Pout at which the depressurization operation is performed by the depressurizing mechanism 64*b*.

The term "instantaneously" indicates that, when the differences between the pressure in the modes before and after the transition of the modes are 100%, changes in the pressure per second are equal to or greater than 50%, preferably equal to or greater than 65%.

From the same viewpoint, to switch from the execution of the filling operation MF to the execution of the standby operation MS_1, the control unit 20 instantaneously changes, from the pressure PT1_F to the pressure PT1_S, the pressure Pin at which the pressurization operation is performed by the pressurizing mechanism 64*a*, and instantaneously changes, from the pressure PT2_F to the pressure PT2_S, the pressure Pout at which the depressurization operation is performed by the depressurizing mechanism 64*b*. In this case, it is preferable that the length of time which the filling operation MF is executed be set such that the ink does not drip from the nozzles N. To switch from the execution of the filling operation MF to the execution of the standby operation MS_1, the control unit 20 may gradually change the pressure Pin and Pout in the same manner as in the inter-mode pressure control MM described later.

The air bubble discharge operation MD is executed to control the operation of the liquid ejecting head 50 under pressurization at pressure PT1_D by the pressurizing mechanism 64*a* and depressurization at pressure PT2_D by the depressurizing mechanism 64*b*. In this case, when the air bubble discharge operation MD is the "first mode", the pressure PT1_D is an example of the "first pressure" and the pressure PT2_D is an example of the "second pressure". When the air bubble discharge operation MD is the "second mode", the pressure PT1_D is an example of "third pressure" and the pressure PT2_D is an example of "fourth pressure".

The pressure PT1_D is higher than the pressure PT1_S and the pressure PT2_D is lower than the pressure PT2_S. In the example illustrated in FIGS. 6 and 7, the pressure PT1_D is 18 kPa and the pressure PT2_D is −20 kPa. The absolute value of the pressure PT2_D is larger than the absolute value of the pressure PT1_D. Therefore, the pressure Pn in the vicinity of the nozzles N is negative. As a result, the ink is prevented from dripping from the nozzles N. In the example illustrated in FIGS. 6 and 7, the pressure Pn is −2 kPa. Since the pressure Pn is negative in a predetermined range, the meniscus of the ink in the nozzles N is maintained. As a result, mixing of air bubbles into the nozzles N or the like is prevented.

Each of the pressure PT1_D and the pressure PT2_D is not limited to the pressure in the example illustrated in FIGS. 6 and 7. A length of time which the air bubble discharge operation MD is executed is not limited to a length of time in the example illustrated in FIGS. 6 and 7 and may be arbitrary.

As described above, each of the standby operation MS_1 and the air bubble discharge operation MD is executed in a state in which the inside of the liquid ejecting head 50 is filled with the ink. In a state in which the inside of the liquid ejecting head 50 is filled with the ink, when the operation of the pressurizing mechanism 64*a* and the operation of the depressurizing mechanism 64*b* are rapidly changed, the pressure Pin at which the pressurization operation is performed by the pressurizing mechanism 64*a* and the pressure Pout at which the depressurization operation is performed by the depressurizing mechanism 64*b* may be easily unbalanced, an unintended change in the pressure Pn in the vicinity of the nozzles N may occur, and as a result, the ink may drip from one or more of the nozzles N. The greater a change in the pressure Pin and a change in the pressure Pout in the modes before and after the transition of the modes, the more likely this problem may be to occur. When the difference between the pressure Pin in the modes before and after the transition of the modes and the difference between the pressure Pout in the modes before and after the transition of the modes are greater than 10 kPa, this problem is noticeable.

Therefore, to switch from the execution of the standby operation MS_1 to the execution of the air bubble discharge operation MD, the control unit 20 gradually changes each of the pressure Pin at which the pressurization operation is performed by the pressurizing mechanism 64*a* and the pressure Pout at which the depressurization operation is performed by the depressurizing mechanism 64*b*. Specifically, the control unit 20 executes the inter-mode pressure control MM_1 after the execution of the standby operation MS_1 and before the execution of the air bubble discharge operation MD.

To switch from the execution of the standby operation MS_1 to the execution of the air bubble discharge operation MD, the inter-mode pressure control MM_1 is executed to gradually change the pressure Pin from the pressure PT1_S to the PT1_D and gradually change the pressure Pout from the pressure PT2_S to the PT2_D. In this case, each of the pressure Pin at which the pressurization operation is performed by the pressurizing mechanism 64*a* and the pressure Pout at which the depressurization operation is performed by the depressurizing mechanism 64*b* is controlled such that the pressure Pn is predetermined negative pressure. It is preferable that the predetermined negative pressure be such that the meniscus of the ink in the nozzles N is not broken. Specifically, the predetermined negative pressure is preferably equal to or higher than −5 kPa.

The term "gradually" indicates that, when the differences between the pressure in the modes before and after the transition of the modes are 100%, changes in the pressure per second are less than 50%, preferably less than 350.

In the example illustrated in FIGS. 6 and 7, a length of time which the pressurizing mechanism 64*a* is operated in the inter-mode pressure control MM_1 and a length of time which the depressurizing mechanism 64*b* is operated in the inter-mode pressure control MM_1 are equal to a length of time which the inter-mode pressure control MM_1 is executed. Therefore, in the inter-mode pressure control MM_1, the length of time which the pressurizing mechanism 64*a* is operated is equal to the length of time which the depressurizing mechanism 64*b* is operated. As a result, in the inter-mode pressure control MM_1, it is possible to appropriately reduce an unintended change in the pressure Pn.

The printing operation MP is executed to control the operation of the liquid ejecting head 50 under pressurization at pressure PT1_P by the pressurizing mechanism 64*a* and depressurization at pressure PT2_P by the depressurizing mechanism 64*a*. In this case, the pressure PT1_P is an example of the "third pressure" and "ninth pressure" and the pressure PT2_P is an example of the "fourth pressure" and "tenth pressure".

The pressure PT1_P is lower than the pressure PT1_D and the pressure PT2_P is higher than the pressure PT2_D. In the example illustrated in FIGS. 6 and 7, the pressure PT1_P is 3 kPa and the pressure PT2_P is −5 kPa. The absolute value of the pressure PT2_P is larger than the absolute value of the pressure PT1_P. Therefore, the pressure Pn in the vicinity of the nozzles N is negative. As a result, the ink is prevented from dripping from the nozzles N. In the example illustrated in FIGS. 6 and 7, the pressure Pn is −2 kPa. Since the pressure Pn is negative in a predetermined range, the meniscus of the ink in the nozzles N is maintained. As a result, mixing of air bubbles into the nozzles N or the like is prevented.

As described above, each of the air bubble discharge operation MD and the printing operation MP is executed in a state in which the inside of the liquid ejecting head 50 is filled with the ink. In addition, a change in the pressure Pin and a change in the pressure Pout in the modes before and after the transition of the modes are greater than 10 kPa.

To switch from the execution of the air bubble discharge operation MD to the execution of the printing operation MP, each of the pressure Pin at which the pressurization operation is performed by the pressurizing mechanism 64*a* and the pressure Pout at which the depressurization operation is performed by the depressurizing mechanism 64*b* is gradually changed in order to prevent the ink from dripping from the nozzles N. Specifically, the control unit 20 executes the inter-mode pressure control MM_2 after the execution of the air bubble discharge operation MD and before the execution of the printing operation MP.

To switch from the execution of the air bubble discharge operation MD to the execution of the printing operation MP, the inter-mode pressure control MM_2 is executed to gradually change the pressure Pin from the pressure PT1_D to the pressure PT1_P and gradually change the pressure Pout from the pressure PT2_D to the pressure PT2_P. In this case, each of the pressure Pin at which the pressurization operation is performed by the pressurizing mechanism 64*a* and the pressure Pout at which the depressurization operation is performed by the depressurizing mechanism 64*b* is controlled such that the pressure Pn is predetermined negative pressure. It is preferable that the predetermined negative pressure be such that the meniscus of the ink in the nozzles N is not broken. Specifically, the predetermined negative pressure is preferably equal to or higher than −5 kPa.

In the example illustrated in FIGS. 6 and 7, in the inter-mode pressure control MM_2, a length of time which the pressurizing mechanism 64*a* is operated and a length of time which the depressurizing mechanism 64*b* is operated are equal to a length of time which the inter-mode pressure control MM_2 is executed. Therefore, in the inter-mode pressure control MM_2, the length of time which the pressurizing mechanism 64*a* is operated is equal to the length of time which the depressurizing mechanism 64*b* is operated. As a result, in the inter-mode pressure control MM_2, it is possible to appropriately reduce an unintended change in the pressure Pn.

The difference between the pressure PT1_P and the pressure PT1_S and the difference between the pressure PT2_P and the pressure PT2_S are less than 10 kPa. Therefore, to switch from the execution of the printing operation MP to the execution of the standby operation MS, even when the operation of the pressurizing mechanism 64*a* and the operation of the depressurizing mechanism 64*b* are rapidly changed, the ink hardly drips from the nozzles N.

To switch from the execution of the printing operation MP to the execution of the standby operation MS, the control unit 20 instantaneously changes, from the pressure PT1_P to the pressure PT1_S, the pressure Pin at which the pressurization operation is performed by the pressurizing mechanism 64*a*, and instantaneously changes, from the pressure PT2_P to the pressure PT2_S, the pressure Pout at which the depressurization operation is performed by the depressurizing mechanism 64*b* in order to speed up the switching.

Figure 8:
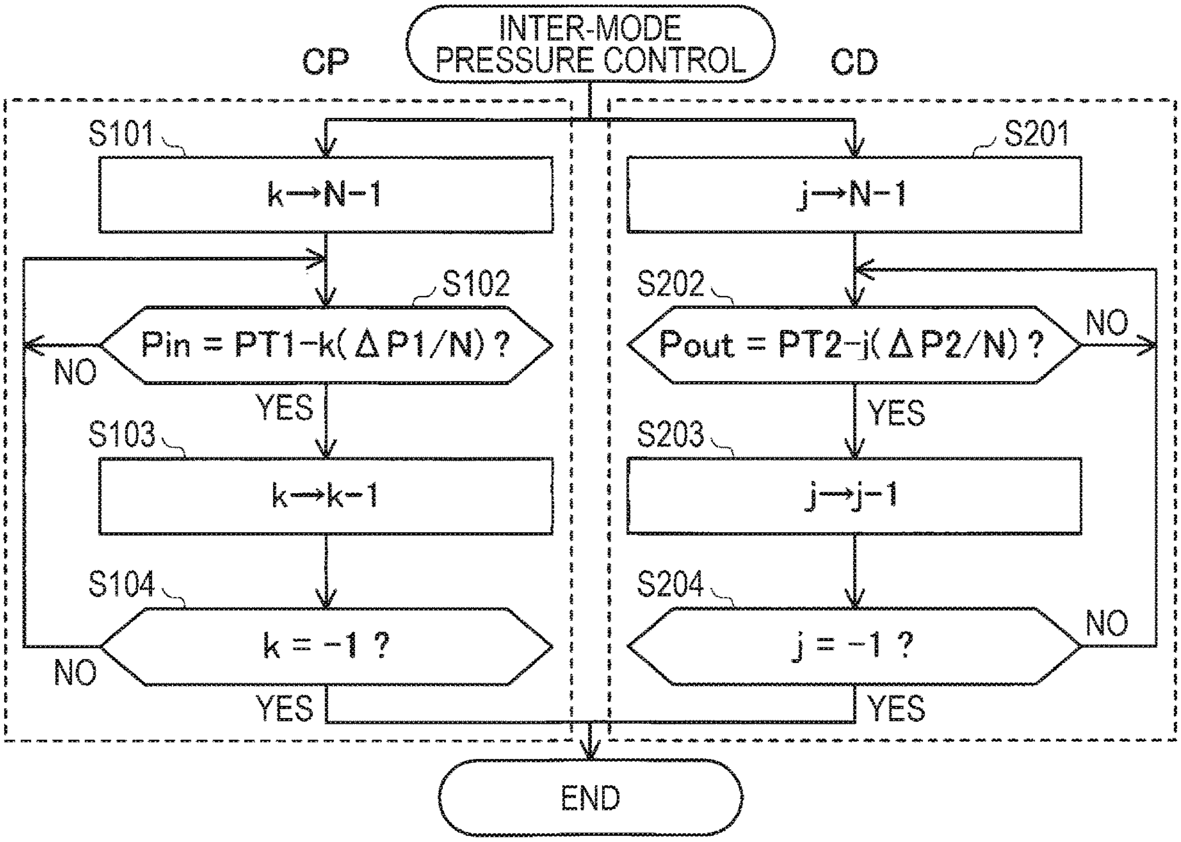
FIG. 8 is a diagram illustrating an example of inter-mode pressure control.

FIG. 8 is a diagram illustrating an example of the inter-mode pressure control MM. As illustrated in FIG. 8, in the inter-mode pressure control MM, pressurization control CP and depressurization control CD are executed.

In the pressurization control CP, first, in step S101, the control unit 20 sets k to (N−1). N is a natural number of 3 or greater, preferably a natural number of 4 or greater, more preferably a natural number of 4 or greater and 10 or less. In this case, a target value of the pressure Pin is target pressure [PT1−k(ΔP1/N)]. Therefore, the control unit 20 controls the operation of the pressurizing mechanism 64*a* such that the pressure Pin is the target pressure [PT1−k(ΔP1/N)].

PT1 is a final target pressure value of the pressure Pin. Therefore, in the inter-mode pressure control MM_1, the pressure PT1 is the pressure PT1_D. In the inter-mode pressure control MM_2, the pressure PT1 is the pressure PT1_P. ΔP1 is the difference between a target value of the pressure Pin in the mode before the inter-mode pressure control MM_1 and a target value of the pressure Pin in the mode after the inter-mode pressure control MM_1. Therefore, in the inter-mode pressure control MM_1, ΔP1 is the difference between the pressure PT1_S and the pressure PT1_D. In the inter-mode pressure control MM_2, ΔP1 is the difference between the pressure PT1_D and the pressure PT1_P.

After step S101, the control unit 20 determines, based on the result of the detection by the pressure sensor 62*a*, whether the pressure Pin reached the target pressure [PT1−k(ΔP1/N)] in step S102. Step S102 is repeatedly performed until the pressure Pin reaches the target pressure [PT1−k(ΔP1/N)] (NO in step S102).

When the control unit 20 determines that the (YES in step S102), the control unit 20 decrements k by 1 in step S103. Therefore, the target value of the pressure Pin is changed so as to approach the pressure PT1.

After step S103, the control unit 20 determines whether k reached (−1) in step S104. When the control unit 20 determines that k did not reach (−1) (NO in step S104), the control unit 20 causes the process to return to step S102. On the other hand, when the control unit 20 determines that k reached (−1) (YES in step S104), the control unit 20 ends the process of the pressurization control CP.

In the pressurization control CP, the target value of the pressure Pin changes from the target pressure [PT1−(N−1) (ΔP1/N)] to the target pressure (PT1) in steps of (ΔP1/N). Therefore, the pressure Pin can be gradually changed to the target value. In this case, [PT1−m(ΔP1/N)] is an example of "first target pressure", and [PT1−(m−1) (ΔP1/N)] is an example of "second target pressure". m is a natural member of 2 or greater and (N−1) or less.

For example, as illustrated in FIG. 7, when the target value of the pressure Pin in the mode before the pressurization control CP is 0 kPa, the final target pressure value of the pressure Pin in the mode after the pressurization control CP is 18 kPa, and N is 5 in the pressurization control CP, the target value of the pressure Pin changes to 3.6 kPa, 7.2 kPa, . . . in steps of 3.6 kPa so as to approach the final target pressure value.

Similarly, in the depressurization control CD, first, in step S201, the control unit 20 sets j to (N−1). N is a natural number of 3 or greater. In this case, in order to gently change the pressure, N is preferably as large as possible. Specifically, N is preferably 4 or greater, more preferably 8 or greater. However, when N is too large, the pressure is too gently changed and the pressure Pout may not reach a final target pressure value PT2 in the inter-mode pressure control MM_1. Therefore, N is preferable in a range such that the pressure Pout can reach the final target pressure value PT2 in the inter-mode pressure control MM_1. The target value of the pressure Pout is target pressure [PT2−j(ΔP2/N)]. Therefore, the control unit 20 controls the operation of the depressurizing mechanism 64*b* such that the pressure Pout is the target pressure [PT2−j(ΔP2/N)].

PT2 is the final target pressure value of the pressure Pout. Therefore, in the inter-mode pressure control MM_1, the final target pressure value PT2 is the pressure PT2_D. In the inter-mode pressure control MM_2, the final target pressure value PT2 is the pressure PT2_P. ΔP2 is the difference between the target value of the pressure Pout in the mode before the inter-mode pressure control MM_1 and the target value of the pressure Pout in the mode after the inter-mode pressure control MM_1. Therefore, in the inter-mode pressure control MM_1, ΔP2 is the difference between the pressure PT2_S and the pressure PT2_D. In the inter-mode pressure control MM_2, ΔP2 is the difference between the pressure PT2_D and the pressure PT2_P.

After step S201, the control unit 20 determines, based on the result of the detection by the pressure sensor 62*b*, whether the pressure Pout reached the target pressure [PT2−j(ΔP2/N)] in step S202. Step S202 is repeatedly performed until the pressure Pout reaches the target pressure [PT2−j (ΔP2/N)] (NO in step S202).

When the control unit 20 determines that the pressure Pout reached the target pressure [PT2−j(ΔP2/N)] (YES in step S202), the control unit 20 decrements j by 1 in step S203. Therefore, the target value of the pressure Pout is changed so as to approach the final target pressure value PT2.

After step S203, the control unit 20 determines whether j reached (−1) in step S204. When the control unit 20 determines that j did not reach (−1) (NO in step S204), the control unit 20 causes the process to return to step S202. On the other hand, when the control unit 20 determines that j reached (−1) (YES in step S204), the control unit 20 ends the process of the depressurization control CD.

In the depressurization control CD, the target value of the pressure Pout changes from the target pressure [PT2−(N−1) (ΔP2/N)] to the target pressure (PT2) in steps of (ΔP2/N). Therefore, the pressure Pout can be gradually changed to the target value. In this case, [PT2−n(ΔP2/N) is an example of "third target pressure", [PT2−(n−1) (ΔP2/N) is an example of "fourth target pressure", and n is a natural number of (N−1) or less.

For example, as illustrated in FIG. 7, when the target value of the pressure Pout in the mode before the depressurization control CD is 0 kPa, the final target pressure value of the pressure Pout in the mode after the depressurization control CD is −20 kPa, and N is 5 in the depressurization control CD, the target value of the pressure Pout changes to −4.0 kPa, −8.0 kPa, . . . in steps of 4.0 kPa so as to approach the final target pressure value.

Figure 9:
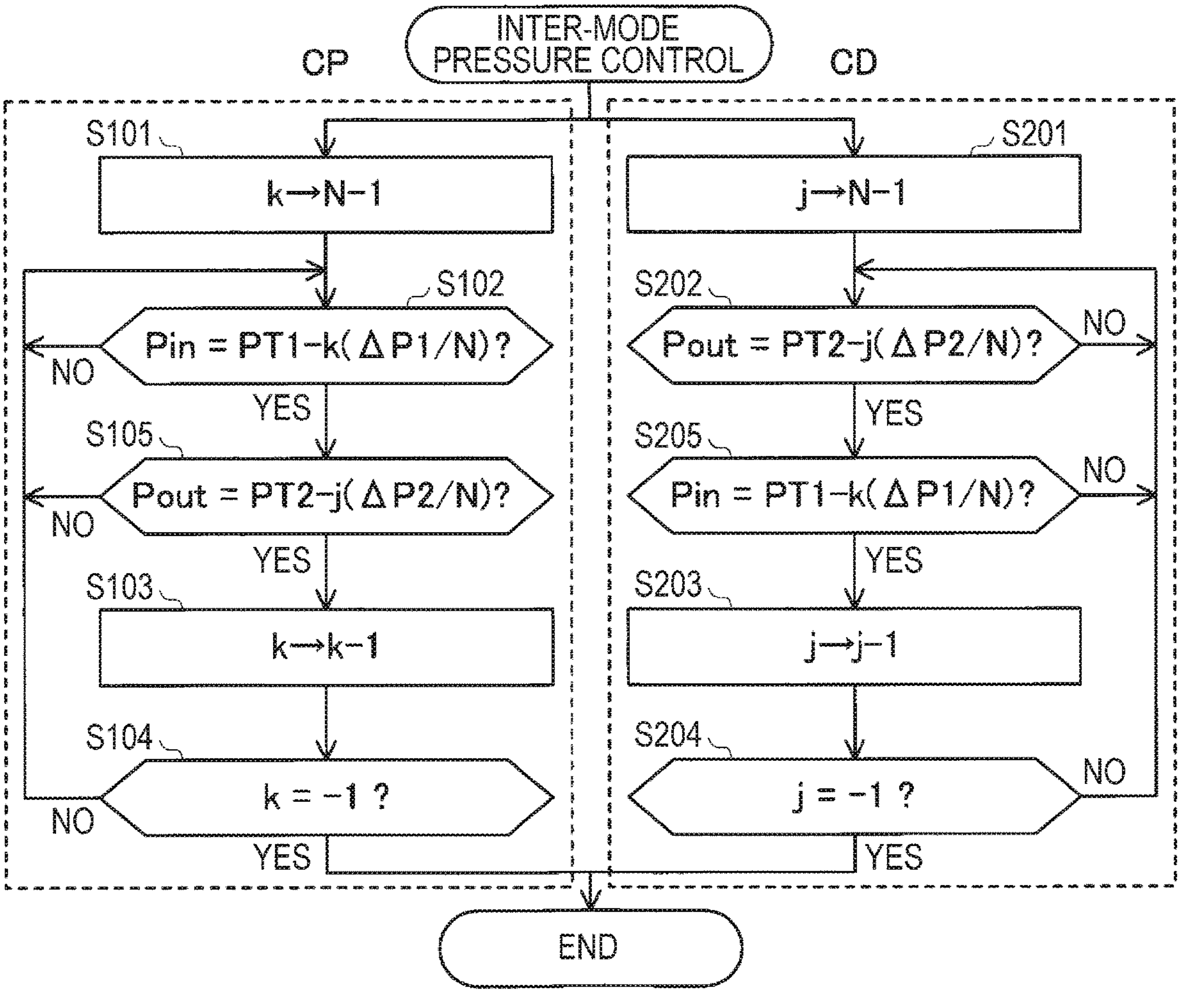
FIG. 9 is a diagram illustrating another example of the inter-mode pressure control.

FIG. 9 is a diagram illustrating another example of the inter-mode pressure control MM. The inter-mode pressure control MM illustrated in FIG. 9 is the same as the inter-mode pressure control MM illustrated in FIG. 8 described above, except that steps S105 and S205 are added to the inter-mode pressure control MM illustrated in FIG. 9.

In pressurization control CP illustrated in FIG. 9, when the control unit 20 determines that the pressure Pin reached the target pressure [PT1−k(ΔP1/N)] (YES in step S102), the control unit 20 determines, based on the result of the detection by the pressure sensor 62*b*, whether the pressure Pout reached the target pressure [PT2−j(ΔP2/N)] in step S105.

When the control unit 20 determines that the pressure Pout did not reach the target pressure [PT2−j(ΔP2/N)] (NO in step S105), the control unit 20 causes the process to return to step S102. On the other hand, when the control unit 20 determines that the pressure Pout reached the target pressure [PT2−j(ΔP2/N)] (YES in step S105), the control unit 20 causes the process to proceed to step S103. The control unit 20 may repeat only step S105 until the pressure Pout reaches the target pressure [PT2−j(ΔP2/N)].

As described above, in the pressurization control CP illustrated in FIG. 9, the driving of the pressurizing mechanism 64*a* is controlled using not only the result of the detection by the pressure sensor 62*a* but also the result of the detection by the pressure sensor 62*b*.

Similarly, in depressurization control CD in the inter-mode pressure control MM illustrated in FIG. 9, when the control unit 20 determines that the pressure Pout reached the target pressure [PT2−j(ΔP2/N)] (YES in step S202), the control unit 20 determines, based on the result of the detection by the pressure sensor 62*a*, whether the in step S205.

When the control unit 20 determines that the pressure Pin did not reach the target pressure [PT1−k(ΔP1/N)] (NO in step S205), the control unit 20 causes the process to return to step S202. On the other hand, when the control unit 20 determines that the pressure Pin reached the target pressure [PT1−k(ΔP1/N)] (YES in step S205), the control unit 20 causes the process to proceed to step S203. The control unit 20 may repeat only step S205 until the pressure Pin reaches the target pressure [PT1−k(ΔP1/N)].

As described above, in the depressurization control CD illustrated in FIG. 9, the driving of the depressurizing mechanism 64*b* is controlled using not only the result of the detection by the pressure sensor 62*b* but also the result of the detection by the pressure sensor 62*a*.

Figure 10:
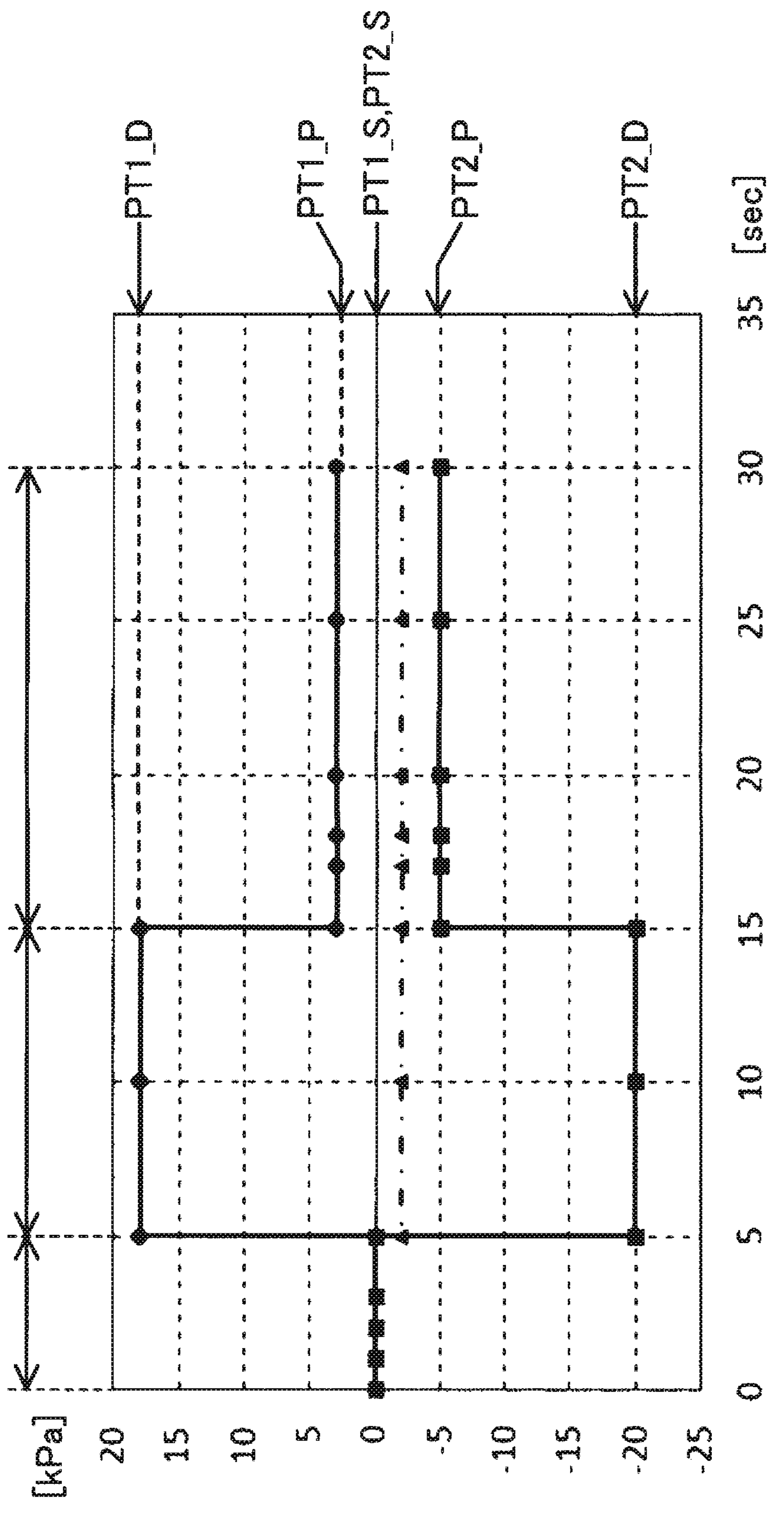
FIG. 10 is a diagram illustrating an example of changes in pressure in components over time according to a first comparative example.

FIG. 10 is a diagram illustrating an example of changes in pressure Pin, Pout, and Pn in components over time according to a first comparative example. In the first comparative example, an operation of a pressurizing mechanism 64*a* and an operation of a depressurizing mechanism 64*b* are controlled in a similar manner to those described with reference to FIG. 7 described above, except that inter-mode pressure control MM is omitted in the first comparative example. Therefore, in the first comparative example, to switch from execution of a standby operation MS to execution of an air bubble discharge operation MD, and to switch from execution of the air bubble discharge operation MD to execution of a printing operation MP, each of the pressure Pin and the pressure Pout is instantaneously changed. Therefore, although not illustrated in FIG. 10, the pressure Pin in the vicinity of nozzles N changes so as to increase in practice, and as a result, ink may drip from the nozzles N.

Figure 11:
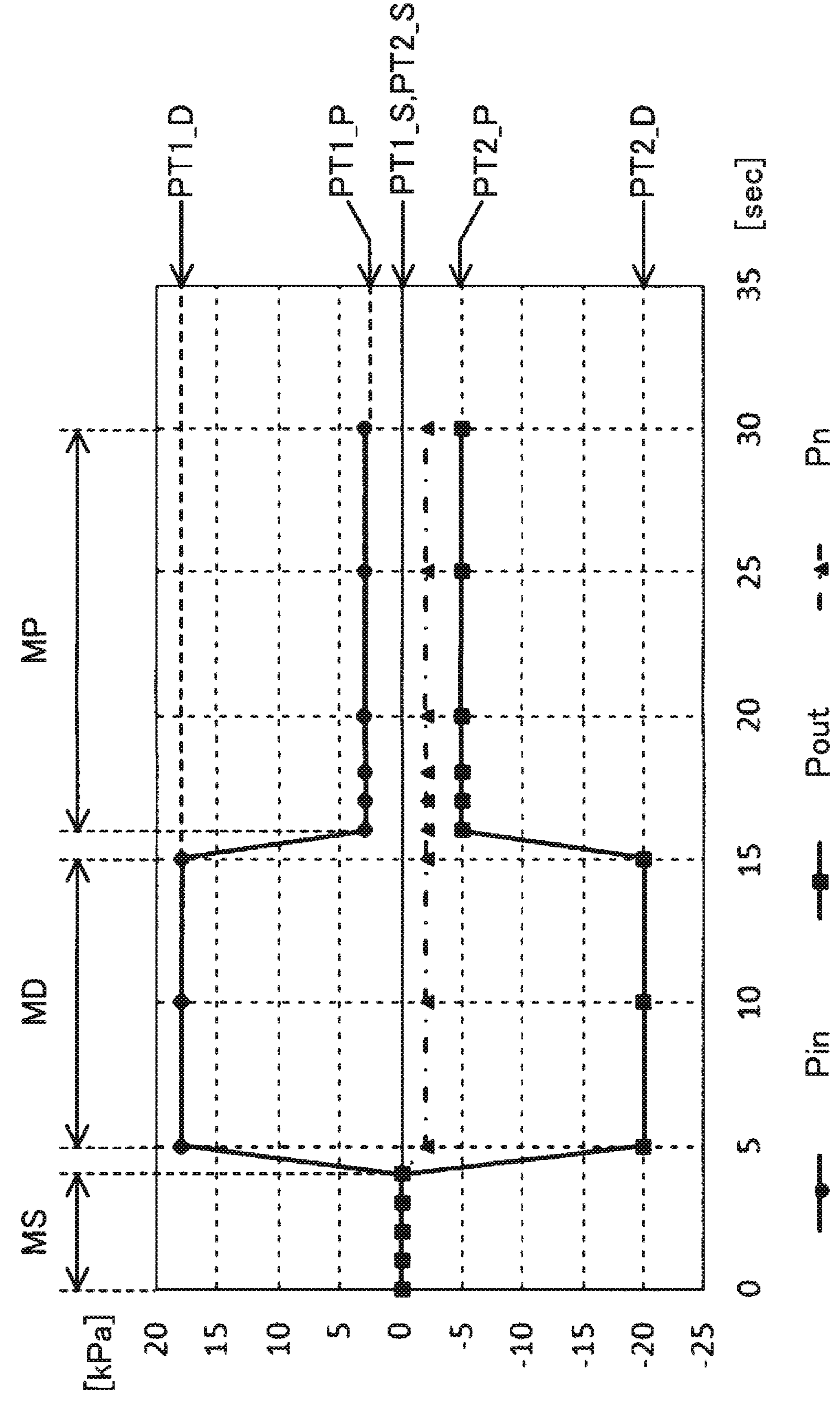
FIG. 11 is a diagram illustrating an example of changes in pressure in components over time according to a second comparative example.

FIG. 11 is a diagram illustrating an example of changes in pressure Pin, Pout, and Pn in components over time according to a second comparative example. Similarly to the first comparative example, in the second comparative example, an operation of a pressurizing mechanism 64*a* and an operation of a depressurizing mechanism 64*b* are controlled in a similar manner to those described with reference to FIG. 7 described above, except that inter-mode pressure control MM is omitted in the second comparative example. However, in the second comparative example, the pressure Pin and Pout more gently change due to resistance to an ink flow, as compared with the first comparative example. However, in the second comparative example, when differences between the pressure in the modes before and after the transition of the modes are 100%, changes in the pressure per second are less than 50%.

Therefore, in the second comparative example, to switch from execution of a standby operation MS to execution of an air bubble discharge operation MD, and to switch from the execution of the air bubble discharge operation MD to execution of a printing operation MP, each of the pressure Pin and the pressure Pout is instantaneously changed. Therefore, although not illustrated in FIG. 11, the pressure Pn in the vicinity of nozzles N changes so as to increase in practice, and as a result, ink may drip from the nozzles N.

As described above, the liquid ejecting apparatus 100 includes the liquid ejecting head 50, the pressurizing mechanism 64*a*, the depressurizing mechanism 64*b*, and the control unit 20. The control unit 20 is an example of the "mode controller". The liquid ejecting head 50 includes the plurality of individual flow paths PJ, the first common liquid chamber R1, and the second common liquid chamber R2. Each of the individual flow paths PJ includes a pressure chamber C communicating with a nozzle N from which ink is ejected. The ink is an example of "liquid". The first common liquid chamber R1 is commonly coupled to one ends of the plurality of individual flow paths PJ. The first common liquid chamber R1 is an example of a "first common flow path". The second common liquid chamber R2 is commonly coupled to the other ends of the plurality of individual flow paths PJ. The second common liquid chamber R2 is an example of a "second common flow path". The pressurizing mechanism 64*a* performs the pressurization operation for supplying the ink to the first common liquid chamber R1. The depressurizing mechanism 64*b* performs the depressurization operation for discharging the ink from the second common liquid chamber R2.

The control unit 20 controls the execution of a plurality of modes including the standby operation MS that is an example of the "first mode" and the air bubble discharge operation MD that is an example of the "second mode". Alternatively, the control unit 20 controls the execution of a plurality of modes including the air bubble discharge operation MD that is an example of the "first mode" and the printing operation MP that is an example of the "second mode".

In the standby operation MS, the operation of the liquid ejecting head 50 is controlled under pressurization at the pressure PT1_S by the pressurizing mechanism 64*a* and depressurization at the pressure PT2_S by the depressurizing mechanism 64*b*. In this case, the pressure PT1_S is an example of the "first pressure" and the pressure PT2_S is an example of the "second pressure".

In the air bubble discharge operation MD, the operation of the liquid ejecting head 50 is controlled under pressurization at the pressure PT1_D by the pressurizing mechanism 64*a* and depressurization at the pressure PT2_D by the depressurizing mechanism 64*b*. In this case, when the air bubble discharge operation MD is the "first mode", the pressure PT1_D is an example of the "first pressure" and the pressure PT2_D is an example of the "second pressure". When the air bubble discharge operation MD is the "second mode", the pressure PT1_D is an example of the "third pressure" and the pressure PT2_D is an example of the "fourth pressure".

In the printing operation MP, the operation of the liquid ejecting head 50 is controlled under pressurization at the pressure PT1_P by the pressurizing mechanism 64*a* and depressurization at the pressure PT2_P by the depressurizing mechanism 64*b*. In this case, the pressure PT1_P is an example of the "third pressure" and the pressure PT2_P is an example of the "fourth pressure".

To switch from the execution of the standby operation MS to the execution of the air bubble discharge operation MD, the control unit 20 gradually changes, from the pressure PT1_S to the pressure PT1_D, the pressure Pin at which the pressurization operation is performed by the pressurizing mechanism 64*a*, and gradually changes, from the pressure PT2_S to the pressure PT2_D, the pressure Pout at which the depressurization operation is performed by the depressurizing mechanism 64*b*. Therefore, it is possible to reduce a fluctuation in the pressure Pn in the vicinity of the nozzles N. As a result, since the probability that the pressure Pn in the vicinity of the nozzles N may become positive in an unintended manner is reduced, the ink is prevented from dripping from the nozzles N. In this case, the term "gradually" indicates that, when the differences between the pressure in the modes before and after the transition of the modes are 100%, changes in the pressure per second are less than 50%, preferably less than 35%.

Similarly, to switch from the execution of the air bubble discharge operation MD to the execution of the printing operation MP, the control unit 20 gradually changes, from the pressure PT1_D to the pressure PT1_P, the pressure Pin at which the pressurization operation is performed by the pressurizing mechanism 64*a*, and gradually changes, from the pressure PT2_D to the pressure PT2_P, the pressure Pout at which the depressurization operation is performed by the depressurizing mechanism 64*b*. Therefore, it is possible to reduce a fluctuation in the pressure Pn in the vicinity of the nozzles N. As a result, since the probability that the pressure Pn in the vicinity of the nozzles N may become positive in an unintended manner is reduced, the ink is prevented from dripping from the nozzles N.

As described above, each of the standby operation MS, the air bubble discharge operation MD, and the printing operation MP is a mode that is executed in a state in which the inside of the liquid ejecting head 50 is filled with the ink. Therefore, as described above, the effect of preventing the ink from dripping from the nozzles N can be noticeably obtained by gradually changing the pressure Pin and Pout.

In the present embodiment, as described above, the plurality of modes include the standby operation MS_0 that is an example of the "third mode" and the filling operation MF that is an example of the "fourth mode". The standby operation MS_0 is executed to control the operation of the liquid ejecting head 50 under pressurization at the pressure PT1_S by the pressurizing mechanism 64*a* and depressurization at the pressure PT2_S by the depressurizing mechanism 64*b*. The filling operation MF is executed to control the operation of the liquid ejecting head 50 under pressurization at the pressure PT1_F by the pressurizing mechanism 64*a* and depressurization at the pressure PT2_F by the depressurizing mechanism 64*b*. In this case, the pressure PT1_S is an example of the "fifth pressure" and the pressure PT2_S is an example of the "sixth pressure". The pressure PT1_F is an example of the "seventh pressure" and the pressure PT2_F is an example of the "eighth pressure".

Each of the standby operation MS_0 and the filling operation MF is a mode that starts to be executed in a state in which the inside of the liquid ejecting head 50 is not filled with the ink. To switch from the execution of the standby operation MS_0 to the execution of the filling operation MF, the control unit 20 instantaneously changes, from the pressure PT1_S to the pressure PT1_F, the pressure Pin at which pressurization is performed by the pressurizing mechanism 64*a*, and instantaneously changes, from the pressure PT2_S to the pressure PT2_F, the pressure Pout at which pressurization is performed by the depressurizing mechanism 64*b*.

In a state in which the inside of the liquid ejecting head 50 is not filled with the ink, even when the pressure in the liquid ejecting head 50 is instantaneously changed, the ink does not drip from the nozzles N. Therefore, to switch from the execution of the standby operation MS_0 to the execution of the filling operation MF, the pressure Pin and Pout is instantaneously changed. Therefore, it is possible to quickly switch between the modes without causing the ink to drip from the nozzles N.

In addition, as described above, each of the difference between the pressure PT1_S and the pressure PT1_D, the difference between the pressure PT2_S and the pressure PT2_D, the difference between the pressure PT1_P and the pressure PT1_D, and the difference between the pressure PT2_P and the pressure PT2_D is greater than 10 kPa. In this case, as described above, the effect of preventing the ink from dripping from the nozzles N can be noticeably obtained by gradually changing the pressure Pin and Pout.

Furthermore, as described above, the plurality of modes include the printing operation MP that is an example of the "fifth mode" and the standby operation MS_2 that is an example of the "sixth mode". The printing operation MP is executed to control the operation of the liquid ejecting head 50 under pressurization at the pressure PT1_P by the pressurizing mechanism 64*a* and depressurization at the pressure PT2_P by the depressurizing mechanism 64*b*. In this case, the pressure PT1_P is an example of the "ninth pressure" and the pressure PT2_D is an example of the "tenth pressure". The standby operation MS is executed to control the operation of the liquid ejecting head 50 under pressurization at the pressure PT1_S by the pressurizing mechanism 64*a* and depressurization at the pressure PT2_S by the depressurizing mechanism 64*b*. In this case, the pressure PT1_S is an example of the "eleventh pressure" and the pressure PT2_S is an example of the "twelfth pressure".

Each of the difference between the pressure PT1_P and the pressure PT1_S and the difference between the pressure PT2_P and the pressure PT2_S is less than 10 kPa. To switch from the execution of the printing operation MP to the execution of the standby operation MS, the control unit 20 instantaneously changes, from the pressure PT1_P to the pressure PT1_S, the pressure Pin at which pressurization is performed by the pressurizing mechanism 64*a*, and instantaneously changes, from the pressure PT2_P to the pressure PT2_S, the pressure Pout at which depressurization is performed by the depressurizing mechanism 64*b*.

Even when the differences between the pressure in the modes before and after the transition of the modes are less than 10 kPa, and the pressure in the liquid ejecting head 50 is instantaneously changed, the ink hardly drips from the nozzles N. Therefore, to switch from the execution of the printing operation MP to the execution of the standby operation MS, each of the pressure Pin and the pressure Pout is instantaneously changed so as to prevent the ink from dripping from the nozzles N. Therefore, it is possible to quickly switch between the modes.

In addition, as described above, the air bubble discharge operation MD is a mode for discharging an air bubble within the liquid ejecting head 50. The printing operation MP is a mode for performing printing by ejecting ink from the liquid ejecting head 50. In this case, the pressure PT1_P is lower than the pressure PT1_D and the pressure PT2_P is higher than the pressure PT2_D. Each of the air bubble discharge operation MD and the printing operation MP is executed in a state in which the inside of the liquid ejecting head 50 is filled with the ink. Therefore, to switch from the execution of the air bubble discharge operation MD to the execution of the printing operation MP, the pressure Pin and Pout is gradually changed. As a result, it is possible to noticeably obtain the effect of preventing the ink from dripping from the nozzles N.

In addition, as described above, the standby operation MS is a mode for standing by in a state in which the inside of the liquid ejecting head 50 is filled with the ink. The air bubble discharge operation MD is a mode for discharging an air bubble within the liquid ejecting head 50. In this case, the pressure PT1_D is higher than the pressure PT1_S and the pressure PT2_D is lower than the pressure PT2_S. Each of the standby operation MS and the air bubble discharge operation MD is executed in a state in which the inside of the liquid ejecting head 50 is filled with the ink. Therefore, to switch from the execution of the standby operation MS to the execution of the air bubble discharge operation MD, the pressure Pin and the Pout is gradually changed. As a result, it is possible to noticeably obtain the effect of preventing the ink from dripping from the nozzles N.

In addition, as described above, the liquid ejecting apparatus 100 further includes the pressure sensor 62*a* that is an example of the "first detector" and the pressure sensor 62*b* that is an example of the "second detector". The pressure sensor 62*a* detects the pressure Pin between the pressurizing mechanism 64*a* and the liquid ejecting head 50. The pressure sensor 62*b* detects the pressure Pout between the depressurizing mechanism 64*b* and the liquid ejecting head 50.

To switch from the execution of the standby operation MS to the execution of the air bubble discharge operation MD or to switch from the execution of the air bubble discharge operation MD to the execution of the printing operation MP, the control unit 20 executes the pressurization control CP and the depressurization control CD.

To switch from the execution of the standby operation MS to the execution of the air bubble discharge operation MD, the pressurization control CP is executed to control the driving of the pressurizing mechanism 64*a* using the first target pressure [PT1−m(ΔP1/N)] as a target value over a time period until the result of the detection by the pressure sensor 62*a* reaches the first target pressure [PT1−m(ΔP1/N)] that is pressure between the pressure PT1_S and the pressure PT1_D, and to control the driving of the pressurizing mechanism 64*a* using the second target pressure [PT1−(m−1) (ΔP1/N)] as a target value over a time period after the result of the detection by the pressure sensor 62*a* reaches the first target pressure [PT1−m(ΔP1/N)] and until the result of the detection by the pressure sensor 62*a* reaches the second target pressure [PT1−(m−1) (ΔP1/N)] that is pressure between the first target pressure [PT1−m(ΔP1/N)] and the pressure PT1_D.

To switch from the execution of the standby operation MS to the execution of the air bubble discharge operation MD, the depressurization control CD is executed to control the driving of the depressurizing mechanism 64*b* using the third target pressure [PT2−n(ΔP2/N)] as a target value over a time period until the result of the detection by the pressure sensor 62*b* reaches the third target pressure [PT2−n(ΔP2/N)] that is pressure between the pressure PT2_S and the pressure PT2_D, and to control the driving of the depressurizing mechanism 64*b* using the fourth target pressure [PT2−(n−1) (ΔP2/N)] as a target value over a time period after the result of the detection by the pressure sensor 62*b* reaches the third target pressure [PT2−n(ΔP2/N)] and until the result of the detection by the pressure sensor 62*b* reaches the fourth target pressure [PT2−(n−1) (ΔP2/N)] that is pressure between the third target pressure [PT2−n(ΔP2/N)] and the pressure PT2_D.

To switch from the execution of the standby operation MS to the execution of the air bubble discharge operation MD, it is possible to gradually change the pressure Pin and Pout by the pressurization control CP and the depressurization control CD in a relatively easy manner.

To switch from the execution of the air bubble discharge operation MD to the execution of the printing operation MP, the pressurization control CP is executed to control the driving of the pressurizing mechanism 64*a* using the first target pressure [PT1−m(ΔP1/N)] as a target value over a time period until the result of the detection by the pressure sensor 62*a* reaches the first target pressure [PT1−m(ΔP1/N)] that is pressure between the pressure PT1_D and the pressure PT1_P, and to control the driving of the pressurizing mechanism 64*a* using the second target pressure [PT1−(m−1) (ΔP1/N)] as a target value over a time period after the result of the detection by the pressure sensor 62*a* reaches the first target pressure [PT1−m(ΔP1/N)] and until the result of the detection by the pressure sensor 62*a* reaches the second target pressure [PT1−(m−1) (ΔP1/N)] that is pressure between the first target pressure [PT1−m(ΔP1/N)] and the pressure PT1_P.

To switch from the execution of the air bubble discharge operation MD to the execution of the printing operation MP, the depressurization control CD is executed to control the driving of the depressurizing mechanism 64*b* using the third target pressure [PT2−n(ΔP2/N)] as a target value over a time period until the result of the detection by the pressure sensor 62*b* reaches the third target pressure [PT2−n(ΔP2/N)] that is pressure between the pressure PT2_S and the pressure PT2_P, and to control the driving of the depressurizing mechanism 64*b* using the fourth target pressure [PT2−(n−1) (ΔP2/N)] as a target value over a time period after the result of the detection by the pressure sensor 62*b* reaches the third target pressure [PT2−n(ΔP2/N)] and until the result of the detection by the pressure sensor 62*b* reaches the fourth target pressure [PT2−(n−1) (ΔP2/N)] that is pressure between the third target pressure [PT2−n(ΔP2/N)] and the pressure PT2_P.

To switch from the execution of the air bubble discharge operation MD to the execution of the printing operation MP, it is possible to gradually change the pressure Pin and Pout by the pressurization control CP and the depressurization control CD in a relatively easy manner.

In addition, as described above, it is preferable that, to switch from the execution of the standby operation MS to the execution of the air bubble discharge operation MD or to switch from the execution of the air bubble discharge operation MD to the execution of the printing operation MP, the control unit 20 execute the pressurization control CP based on the result of the detection by the pressure sensor 62*a*, the result of the detection by the pressure sensor 62*b*, the first target pressure [PT1−m(ΔP1/N)], and the second target pressure [PT1−(m−1) (ΔP1/N)] and execute the depressurization control CD based on the result of the detection by the pressure sensor 62*a*, the result of the detection by the pressure sensor 62*b*, the third target pressure [PT2−n(ΔP2/N)], and the fourth target pressure [PT2−(n−1) (ΔP2/N)]. In this case, the pressure Pin at which the pressurization operation is performed by the pressurizing mechanism 64*a* and the pressure Pout at which the depressurization operation is performed by the depressurizing mechanism 64*b* can be changed in a well-balanced manner.

In addition, as described above, to switch from the execution of the standby operation MS to the execution of the air bubble discharge operation MD or to switch from the execution of the air bubble discharge operation MD to the execution of the printing operation MP, the control unit 20 controls the pressurization operation by the pressurizing mechanism 64*a* and the depressurization operation by the depressurizing mechanism 64*b* such that pressure in the individual flow paths PJ in the vicinity of the nozzles N is negative. Therefore, it is possible to switch from the execution of the standby operation MS to the execution of the air bubble discharge operation MD or to switch from the execution of the air bubble discharge operation MD to the execution of the printing operation MP without causing the ink to drip from the nozzles N.

Furthermore, as described above, to switch from the execution of the standby operation MS to the execution of the air bubble discharge operation MD or to switch from the execution of the air bubble discharge operation MD to the execution of the printing operation MP, the control unit 20 controls the pressurization operation by the pressurizing mechanism 64*a* and the depressurization operation by the depressurizing mechanism 64*b* such that the pressure in the individual flow paths PJ in the vicinity of the nozzles N does not become negative to the extent that the meniscus of the ink is broken. Therefore, it is possible to switch from the execution of the standby operation MS to the execution of the air bubble discharge operation MD or to switch from the execution of the air bubble discharge operation MD to the execution of the printing operation MP without causing the ink to drip from the nozzles N.

The method for controlling the liquid ejecting apparatus 100 as described above includes step S3, step S5, and step S6 or includes step S6, step S8, and step S9.

In step S3, the standby operation MS is executed. After the execution of the standby operation MS, the inter-mode pressure control MM is executed in step S5. After the execution of the inter-mode pressure control MM, the air bubble discharge operation MD is executed in step S6. After the execution of the air bubble discharge operation MD, the inter-mode pressure control MM is executed in step S8. After the execution of the inter-mode pressure control MM, the printing operation MP is executed in step S9.

To switch from the execution of the standby operation MS to the execution of the air bubble discharge operation MD, the inter-mode pressure control MM is executed to gradually change the pressure Pin from the pressure PT1_S to the pressure PT1_D and gradually change the pressure Pout from the pressure PT2_S to the pressure PT2_D. Similarly, to switch from the execution of the air bubble discharge operation MD to the execution of the printing operation MP, the inter-mode pressure control MM is executed to gradually change the pressure Pin from the pressure PT1_D to the pressure PT1_P and gradually change the pressure Pout from the pressure PT2_D to the pressure PT2_P. The above-described control method prevents the ink from dripping from the nozzles N.

2. Second Embodiment

A second embodiment of the present disclosure is described below. In the embodiment exemplified below, elements whose effects and functions are the same as or similar to those described in the first embodiment are denoted by the reference signs used for the description of the first embodiment, and detailed descriptions thereof are omitted as appropriate.

Figure 12:
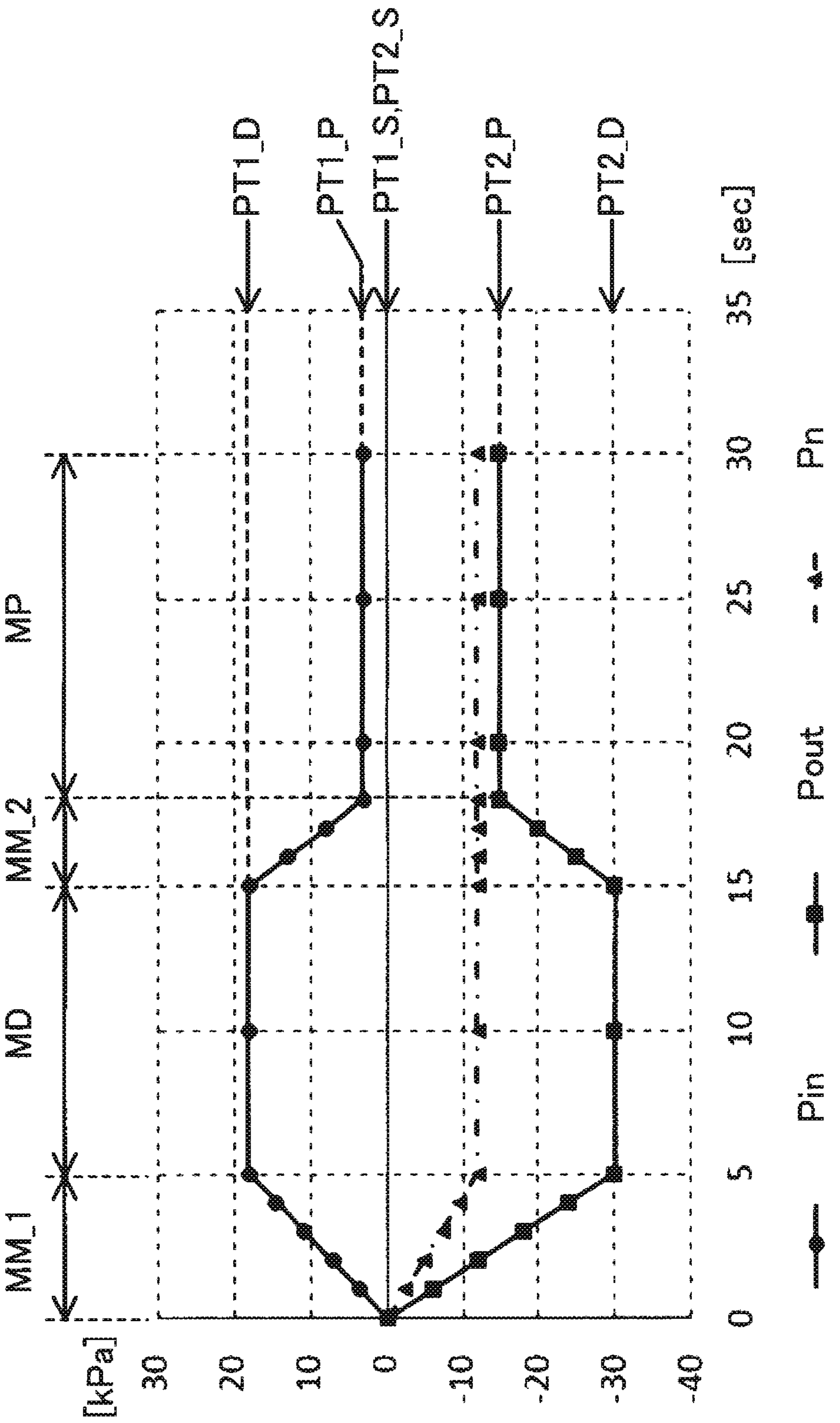
FIG. 12 is a diagram illustrating an example of changes in pressure in components over time according to a second embodiment.

FIG. 12 is a diagram illustrating an example of changes in pressure Pin, Pout, and Pn in components over time according to the second embodiment. The second embodiment is different from the first embodiment in pressure PT2_D and PT2_P and thus is the same as or similar to the first embodiment, except that control of an operation of a depressurizing mechanism 64*b* during the execution of inter-mode pressure control MM_1 and MM_2 in the second embodiment is different from that in the first embodiment.

In an example illustrated in FIG. 12, in an air bubble discharge operation MD, pressure PT1_D at which a pressurization operation is performed by a pressurizing mechanism 64*a* is 18 kPa, and the pressure PT2_D at which a depressurization operation is performed by the depressurizing mechanism 64*b* is −30 kPa. In addition, pressure Pn in the vicinity of nozzles N is −12 kPa. Since the pressure Pn is negative, ink is prevented from dripping from the nozzles N in the air bubble discharge operation MD. However, since the pressure Pn is lower than −5 kPa, there is a possibility that the meniscus of ink in the nozzles N may be broken.

In the example illustrated in FIG. 12, in a printing operation MP, pressure PT1_P at which the pressurization operation is performed by the pressurizing mechanism 64*a* is 3 kPa and the pressure PT2_P at which the depressurization operation is performed by the depressurizing mechanism 64*b* is −15 kPa. In addition, the pressure Pn in the vicinity of the nozzles N is −12 kPa. Since the pressure Pn is negative, the ink is prevented from dripping from the nozzles in the printing operation MP. However, since the pressure Pn is lower than −5 kPa, there is a possibility that the meniscus of the ink in the nozzles N may be broken.

As described above, even in the second embodiment, the ink is prevented from dripping from the nozzles N.

3. Third Embodiment

A third embodiment of the present disclosure is described below. In the embodiment exemplified below, elements whose effects and functions are the same as or similar to those described in the first embodiment are denoted by the reference signs used for the description of the first embodiment, and detailed descriptions thereof are omitted as appropriate.

Figure 13:
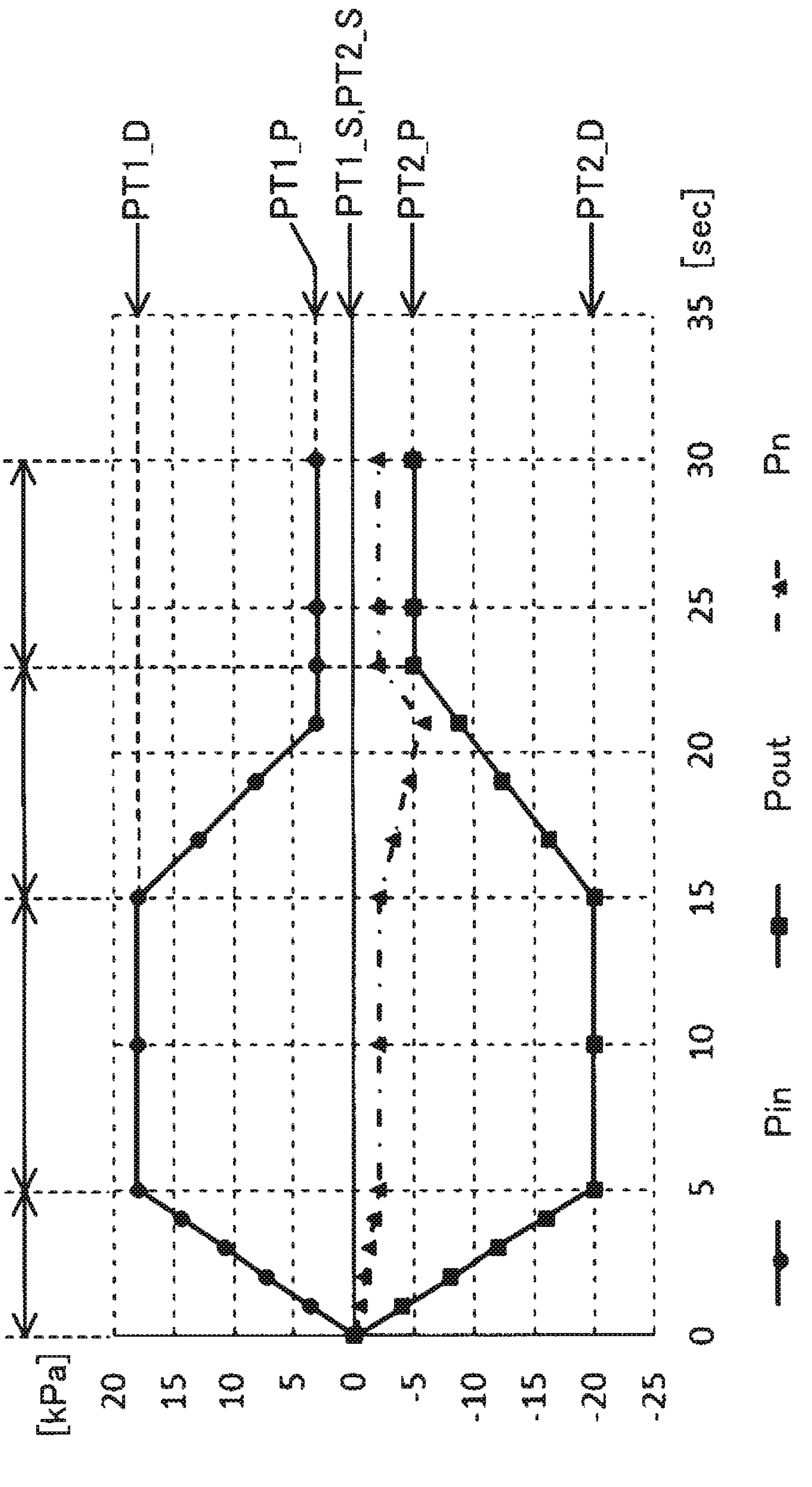
FIG. 13 is a diagram illustrating an example of changes in pressure in components over time according to a third embodiment.

FIG. 13 is a diagram illustrating an example of changes in pressure Pin, Pout, and Pn in components over time according to the third embodiment. The third embodiment is the same as the first embodiment, except that a length of time which inter-mode pressure control MM_2 is executed in the third embodiment is different from that in the first embodiment, and that a length of time which a pressurizing mechanism 64*a* is operated in the inter-mode pressure control MM_2 different from a length of time which a depressurizing mechanism 64*b* is operated in the inter-mode pressure control MM_2 in the third embodiment.

In an example illustrated in FIG. 13, a length of time which the inter-mode pressure control MM_2 is executed is 8 seconds. In the inter-mode pressure control MM_2, the length of time which the depressurizing mechanism 64*b* is operated is equal to the length of time which the inter-mode pressure control MM_2 is executed. Meanwhile, in the inter-mode pressure control MM_2, the length of time which the pressurizing mechanism 64*a* is operated is shorter than the length of time which the inter-mode pressure control MM_2 is executed. As a result, pressure Pn applied to ink in the vicinity of nozzles N changes during the execution of the inter-mode pressure control MM_2. In this case, the pressure Pn is negative. Therefore, in the inter-mode pressure control MM_2, ink is prevented from dripping from the nozzles N. However, since there is a possibility that the pressure Pn may become lower than—5 kPa, there is a possibility that the meniscus of ink in the nozzles N may be broken.

As described above, even in the third embodiment, the ink is prevented from dripping from the nozzles N.

4. Modifications

The embodiments exemplified above may be variously modified. Specific aspects of modifications are exemplified below. Two or more aspects arbitrarily selected from the aspects exemplified below may be combined as appropriate to the extent that the aspects are not mutually inconsistent.

4-1. First Modification

Although each of the embodiments exemplifies the aspect in which the pressurizing mechanism 64*a* includes the compressor 641*a* and the regulator 642*a* and in which the depressurizing mechanism 64*b* includes the vacuum pump 641*b* and the regulator 642*b*, the embodiments are not limited to this aspect. For example, the pressurizing mechanism 64*a* may not include the regulator 642*a*, and the depressurizing mechanism 64*b* may not include the regulator 642*b*.

4-2. Second Modification

Although each of the embodiments exemplifies the aspect in which the operation of the pressurizing mechanism 64*a* and the operation of the depressurizing mechanism 64*b* are controlled using both of the result of the detection by the pressure sensor 62*a* and the result of the detection by the pressure sensor 62*b*, the embodiments are not limited to this aspect. For example, the operation of the pressurizing mechanism 64*a* and the operation of the depressurizing mechanism 64*b* may be controlled using the result of the detection by either one of the pressure sensor 62*a* and the pressure sensor 62*b*. In this case, the other of the pressure sensor 62*a* and the pressure sensor 62*b* may be omitted. In addition, the operation of the pressurizing mechanism 64*a* and the operation of the depressurizing mechanism 64*b* may be controlled based on an average value or the like of the result of the detection by the pressure sensor 62*a* and the result of the detection by the pressure sensor 62*b*.

4-3. Third Modification

Although each of the embodiments exemplifies the case where the execution of the standby operation MS as the "first mode" is switched to the execution of the air bubble discharge operation MD as the "second mode" and the case where the air bubble discharge operation MD as the "first mode" is switched to the printing operation MP as the "second mode", the "first mode" and the "second mode" are not limited thereto. In addition, as long as the plurality of modes whose execution is controlled by the control unit 20 include operations or modes corresponding to the "first mode" and the "second mode", the plurality of modes whose execution is controlled by the control unit 20 may include operations or modes other than the operations or modes exemplified above, or one or more of the operations or modes exemplified above may be omitted.

In this case, when two different modes for the pressure Pin and the pressure Pout are switched, a preceding mode out of the two modes is the "first mode" and a succeeding mode out of the two modes is the "second mode". In this case, as described above, the difference between the pressure Pin as the first pressure in the first mode and the pressure Pin as the third pressure in the second mode or the difference between the pressure Pout as the second pressure in the first mode and the pressure Pout as the fourth pressure in the second mode is typically greater than 10 kPa.

4-4. Fourth Modification

Although each of the embodiments exemplifies the aspect in which each of the target values of the pressure is changed in steps of the same value in each of the pressurization control CP and the depressurization control CD, the embodiments are not limited to this aspect. Values by which the target values are changed may be arbitrary. In addition, as long as the pressure Pin and Pout is gradually changed in the inter-mode pressure control MM, the embodiments are not limited to the aspect in which the target values are changed.

4-5. Fifth Modification

The liquid ejecting apparatus 100 exemplified in each of the embodiments described above may be used for various types of apparatuses such as a facsimile machine and a copying machine, in addition to apparatuses dedicated to printing. The use of the liquid ejecting apparatus described in the present disclosure is not limited to printing. For example, the liquid ejecting apparatus may eject a colorant solution and may be used as a manufacturing apparatus that forms a color filter for a liquid crystal display device. In addition, the liquid ejecting apparatus may eject a solution containing an electrically conductive material and may be used as a manufacturing apparatus that forms a wiring and an electrode of a wiring substrate.

What is claimed is:

1. A liquid ejecting apparatus comprising:

a liquid ejecting head that includes a plurality of individual flow paths including respective pressure chambers communicating with nozzles for ejecting liquid, a first common flow path commonly coupled to one ends of the plurality of individual flow paths, and a second common flow path commonly coupled to the other ends of the plurality of individual flow paths;

a pressurizing mechanism that performs a pressurization operation for supplying the liquid to the first common flow path;

a depressurizing mechanism that performs a depressurization operation for discharging the liquid from the second common flow path; and a mode controller that controls execution of a plurality of modes including a first mode in which an operation of the liquid ejecting head is controlled under pressurization at first pressure by the pressurizing mechanism and depressurization at second pressure by the depressurizing mechanism and a second mode in which the operation of the liquid ejecting head is controlled under pressurization at third pressure by the pressurizing mechanism and depressurization at fourth pressure by the depressurizing mechanism, wherein to switch from the execution of the first mode to the execution of the second mode, the mode controller gradually changes, from the first pressure to the third pressure, pressure at which the pressurization operation is performed by the pressurizing mechanism, and gradually changes, from the second pressure to the fourth pressure, pressure at which the depressurization operation is performed by the depressurizing mechanism, a difference between the first pressure and the third pressure is greater than 10 kPa, and a difference between the second pressure and the fourth pressure is greater than 10 kPa.

2. The liquid ejecting apparatus according to claim 1, wherein the first mode and the second mode are executed in a state in which an inside of the liquid ejecting head is filled with the liquid.

3. The liquid ejecting apparatus according to claim 2, wherein the plurality of modes include a third mode in which the operation of the liquid ejecting head is controlled under pressurization at fifth pressure by the pressurizing mechanism and depressurization at sixth pressure by the depressurizing mechanism, and a fourth mode in which the operation of the liquid ejecting head is controlled under pressurization at seventh pressure by the pressurizing mechanism and depressurization at eighth pressure by the depressurizing mechanism, the third mode and the fourth mode start to be executed in a state in which the inside of the liquid ejecting head is not filled with the liquid, and to switch from the execution of the third mode to the execution of the fourth mode, the mode controller instantaneously changes, from the fifth pressure to the seventh pressure, the pressure at which the pressurization operation is performed by the pressurizing mechanism.

4. The liquid ejecting apparatus according to claim 1, wherein the plurality of modes include a fifth mode in which the operation of the liquid ejecting head is controlled under pressurization at ninth pressure by the pressurizing mechanism and depressurization at tenth pressure by the depressurizing mechanism, and a sixth mode in which the operation of the liquid ejecting head is controlled under pressurization at eleventh pressure by the pressurizing mechanism and depressurization at twelfth pressure by the depressurizing mechanism, a difference between the ninth pressure and the eleventh pressure is less than 10 kPa, a difference between the tenth pressure and the twelfth pressure is less than 10 kPa, and to switch from the execution of the fifth mode to the execution of the sixth mode, the mode controller instantaneously changes, from the ninth pressure to the eleventh pressure, the pressure at which the pressurization operation is performed by the pressurizing mechanism, and instantaneously changes, from the tenth pressure to the twelfth pressure, the pressure at which the depressurization operation is performed by the depressurizing mechanism.

5. The liquid ejecting apparatus according to claim 1, wherein the first mode is a standby operation for standing by in a state in which an inside of the liquid ejecting head is filled with the liquid, the second mode is an air bubble discharge operation for discharging an air bubble within the liquid ejecting head, the third pressure is higher than the first pressure, and the fourth pressure is lower than the second pressure.

6. The liquid ejecting apparatus according to claim 1, further comprising:

a first detector that detects pressure between the pressurizing mechanism and the liquid ejecting head; and a second detector that detects pressure between the depressurizing mechanism and the liquid ejecting head, wherein to switch from the execution of the first mode to the execution of the second mode, the mode controller executes pressurization control to control driving of the pressurizing mechanism using first target pressure as a target value over a time period until the result of the detection by the first detector reaches the first target pressure that is pressure between the first pressure and the third pressure, and to control the driving of the pressurizing mechanism using second target pressure as a target value over a time period after the result of the detection by the first detector reaches the first target pressure and until the result of the detection by the first detector reaches the second target pressure that is pressure between the first target pressure and the third pressure, and the mode controller executes depressurization control to control driving of the depressurizing mechanism using third target pressure as a target value over a time period until the result of the detection by the second detector reaches the third target pressure that is pressure between the second pressure and the fourth pressure, and to control the driving of the depressurizing mechanism using fourth target pressure as a target value over a time period after the result of the detection by the second detector reaches the third target pressure and until the result of the detection by the second detector reaches the fourth target pressure that is pressure between the third target pressure and the fourth pressure.

7. The liquid ejecting apparatus according to claim 6, wherein to switch from the execution of the first mode to the execution of the second mode, the mode controller executes the pressurization control based on the result of the detection by the first detector, the result of the detection by the second detector, the first target pressure, and the second target pressure, and executes the depressurization control based on the result of the detection by the first detector, the result of the detection by the second detector, the third target pressure, and the fourth target pressure.

8. The liquid ejecting apparatus according to claim 7, wherein to switch from the execution of the first mode to the execution of the second mode, the mode controller controls the pressurization operation by the pressurizing mechanism and the depressurization operation by the depressurizing mechanism such that pressure in the individual flow paths in a vicinity of the nozzles is not negative to such an extent that meniscus is broken.

9. A liquid ejecting apparatus comprising:

a liquid ejecting head that includes a plurality of individual flow paths including respective pressure chambers communicating with nozzles for ejecting liquid, a first common flow path commonly coupled to one ends of the plurality of individual flow paths, and a second common flow path commonly coupled to the other ends of the plurality of individual flow paths;

a pressurizing mechanism that performs a pressurization operation for supplying the liquid to the first common flow path;

a depressurizing mechanism that performs a depressurization operation for discharging the liquid from the second common flow path; and a mode controller that controls execution of a plurality of modes including a first mode in which an operation of the liquid ejecting head is controlled under pressurization at first pressure by the pressurizing mechanism and depressurization at second pressure by the depressurizing mechanism and a second mode in which the operation of the liquid ejecting head is controlled under pressurization at third pressure by the pressurizing mechanism and depressurization at fourth pressure by the depressurizing mechanism, wherein to switch from the execution of the first mode to the execution of the second mode, the mode controller gradually changes, from the first pressure to the third pressure, pressure at which the pressurization operation is performed by the pressurizing mechanism, and gradually changes, from the second pressure to the fourth pressure, pressure at which the depressurization operation is performed by the depressurizing mechanism, the first mode is an air bubble discharge operation for discharging an air bubble within the liquid ejecting head, the second mode is a printing operation for performing printing by ejecting the liquid from the liquid ejecting head, the third pressure is lower than the first pressure, and the fourth pressure is higher than the second pressure.

10. A liquid ejecting apparatus comprising:

a liquid ejecting head that includes a plurality of individual flow paths including respective pressure chambers communicating with nozzles for ejecting liquid, a first common flow path commonly coupled to one ends of the plurality of individual flow paths, and a second common flow path commonly coupled to the other ends of the plurality of individual flow paths;

a pressurizing mechanism that performs a pressurization operation for supplying the liquid to the first common flow path;

a depressurizing mechanism that performs a depressurization operation for discharging the liquid from the second common flow path; and a mode controller that controls execution of a plurality of modes including a first mode in which an operation of the liquid ejecting head is controlled under pressurization at first pressure by the pressurizing mechanism and depressurization at second pressure by the depressurizing mechanism and a second mode in which the operation of the liquid ejecting head is controlled under pressurization at third pressure by the pressurizing mechanism and depressurization at fourth pressure by the depressurizing mechanism, wherein to switch from the execution of the first mode to the execution of the second mode, the mode controller gradually changes, from the first pressure to the third pressure, pressure at which the pressurization operation is performed by the pressurizing mechanism, and gradually changes, from the second pressure to the fourth pressure, pressure at which the depressurization operation is performed by the depressurizing mechanism, and to switch from the execution of the first mode to the execution of the second mode, the mode controller controls the pressurization operation by the pressurizing mechanism and the depressurization operation by the depressurizing mechanism such that pressure in the individual flow paths in a vicinity of the nozzles is negative.

* * * * *